(12) United States Patent
Kang et al.

(10) Patent No.: US 11,539,421 B2
(45) Date of Patent: Dec. 27, 2022

(54) METHOD FOR RECOVERING BEAM IN WIRELESS COMMUNICATION SYSTEM AND DEVICE THEREFOR

(71) Applicant: LG Electronics Inc., Seoul (KR)

(72) Inventors: Jiwon Kang, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/492,472

(22) PCT Filed: Aug. 21, 2017

(86) PCT No.: PCT/KR2017/009084
§ 371 (c)(1),
(2) Date: Sep. 9, 2019

(87) PCT Pub. No.: WO2018/164332
PCT Pub. Date: Sep. 13, 2018

(65) Prior Publication Data
US 2020/0389220 A1    Dec. 10, 2020

Related U.S. Application Data

(60) Provisional application No. 62/469,507, filed on Mar. 9, 2017.

(51) Int. Cl.
*H04B 7/06* (2006.01)
*H04L 5/00* (2006.01)
(Continued)

(52) U.S. Cl.
CPC ......... *H04B 7/0695* (2013.01); *H04L 5/0048* (2013.01); *H04W 72/046* (2013.01); *H04W 72/0413* (2013.01); *H04W 74/0833* (2013.01)

(58) Field of Classification Search
CPC ...... H04B 7/0695; H04B 7/063; H04B 7/088; H04L 5/0048; H04W 72/0413; H04W 72/046; H04W 74/0833
See application file for complete search history.

(56) References Cited

U.S. PATENT DOCUMENTS

| | | | |
|---|---|---|---|
| 2013/0155847 A1* | 6/2013 | Li | H04W 76/10 370/225 |
| 2014/0334566 A1* | 11/2014 | Kim | H04B 7/0695 375/267 |

(Continued)

FOREIGN PATENT DOCUMENTS

| | | |
|---|---|---|
| CN | 104115419 | 10/2014 |
| CN | 104982055 | 10/2015 |

(Continued)

OTHER PUBLICATIONS

3rd Generation Partnership Project; Technical Specification Group Radio Access Network; "Study on New Radio (NR) Access Technology Physical Layer Aspects (Release 14)," 3GPP TR 38.802 V1.2.0, dated Feb. 2017, 82 pages.

(Continued)

*Primary Examiner* — Saumit Shah
(74) *Attorney, Agent, or Firm* — Fish & Richardson P.C.

(57) ABSTRACT

Provided is a beam recovery method in a wireless communication system. A beam recovery method performed by a user terminal (UE) may include receiving a beam reference signal (BRS) used for beam management from an enhanced Node B (eNB), when a beam failure event is detected, transmitting a control signal for a beam failure recovery request to the eNB; and, when beam reporting is triggered, reporting a beam measurement result to the eNB in a specific resource.

11 Claims, 12 Drawing Sheets

(51) Int. Cl.
*H04W 72/04* (2009.01)
*H04W 74/08* (2009.01)

(56) References Cited

U.S. PATENT DOCUMENTS

| | | | | |
|---|---|---|---|---|
| 2017/0303265 | A1* | 10/2017 | Islam | H04L 5/0051 |
| 2018/0034612 | A1* | 2/2018 | Lin | H04B 7/0626 |
| 2018/0083680 | A1* | 3/2018 | Guo | H04L 5/0007 |
| 2018/0092129 | A1* | 3/2018 | Guo | H04W 56/001 |
| 2018/0131425 | A1* | 5/2018 | Li | H04W 72/1284 |
| 2018/0139791 | A1* | 5/2018 | Bai | H04B 7/0408 |
| 2018/0146419 | A1* | 5/2018 | Raghavan | H04B 7/0695 |
| 2018/0219606 | A1* | 8/2018 | Ng | H04L 5/0053 |
| 2018/0368114 | A1* | 12/2018 | Chen | H04L 5/0053 |
| 2019/0029036 | A1* | 1/2019 | John Wilson | H04B 7/0408 |
| 2019/0349960 | A1* | 11/2019 | Li | H04L 1/1812 |
| 2020/0059398 | A1* | 2/2020 | Pan | H04L 5/0048 |
| 2020/0280359 | A1* | 9/2020 | Jung | H04W 72/1284 |

FOREIGN PATENT DOCUMENTS

| | | |
|---|---|---|
| WO | WO2016127403 | 8/2016 |
| WO | WO2016168985 | 10/2016 |
| WO | WO2017024516 | 2/2017 |

OTHER PUBLICATIONS

CATT, "Considerations on beam recovery mechanism," R1-1702078, 3GPP TSG RAN WG1 Meeting #88, Athens, Greece, dated Feb. 13-17, 2017, 6 pages.

Ericsson, "On group-based reporting of Tx beams," R1-1702675, 3GPP TSG-RAN WG1 #88, Athens, Greece, dated Feb. 13-17, 2017, 7 pages.

Guangdong OPPO Mobile Telecom, "On Beam Recovery Mechanism," R1-1701944, 3GPP TSG RAN WG1 Meeting #88, Athens, Greece, dated Feb. 13-17, 2017, 4 pages.

Korean Office Action in Korean Application No. 10-2019-7029170, dated Jul. 3, 2020, 19 pages (with English translation).

PCT International Search Report in International Application No. PCT/KR2017/009084, dated Dec. 22, 2017, 20 pages (with English translation).

Samsung, "Trigger condition for beam failure recovery," R1-1702939, 3GPP TSG RAN WG1 Meeting #88, Athens, Greece, dated Feb. 13-17, 2017, 4 pages.

CMCC, "Discussion on UE triggered beam reporting for beam recovery," R1-1703404, 3GPP TSG RAN WG 1 Meeting #88, Athens, Greece, Feb. 13-17, 2017, 4 pages.

Extended European Search Report in European Appln. No. 17899823.3, dated Oct. 7, 2020, 17 pages.

Japanese Office Action in Japanese Appln. No. 2019-548875, dated Dec. 8, 2020, 5 pages (with English translation).

MediaTek Inc., "Aspects for UE-initiated beam recovery," R1-1702730, 3GPP TSG RAN WG1 Meeting #88, Athens, Greece, Feb. 13-17, 2017, 5 pages.

Nokia, Alcatel-Lucent Shanghai Bell, "Beam Recovery in NR," R2-1701681, 3GPP TSG-RAN WG2 Meeting #97, Athens, Greece, Feb. 13-17, 2017, 5 pages.

CMCC, "Discussion on UE triggered beam reporting for beam recovery," R1-1700436, Presented at 3GPP TSG RAN WG1 NR Ad-Hoc Meeting, Spokane, USA, Jan. 16-20, 2017, 5 pages.

Office Action in Chinese Appln. No. 201780089430.7, dated Jul. 18, 2022, 21 pages (with English translation).

* cited by examiner

FIG. 8

| | PMI Feedback Type | |
|---|---|---|
| | No PMI (OL, TD, single-antenna) | With PMI (CL) |
| Wideband (Wideband CQI) | | Mode 1-2: Multiple PMI<br>RI<br>$1^{st}$ wideband CQI (4bit)<br>$2^{nd}$ wideband CQI (4bit) if RI>1<br>Subband PMIs on each subband |
| UE Selected (subband CQI) | Mode 2-0<br>RI (only for Open-loop SM)<br>Wideband CQI (4bit)+Best-M CQI (2bit)<br>Best-M index<br>when RI>1, CQI of first codeword | Mode 2-2: Multiple PMI<br>RI<br>$1^{st}$ wideband CQI (4bit)+Best-M CQI (2bit)<br>$2^{nd}$ wideband CQI (4bit)+Best-M CQI (2bit) if RI>1<br>Wideband PMI    Best-M PMI<br>Best-M index |
| Higher layer-configured (subband CQI) | Mode 2-0<br>RI (only for Open-loop SM)<br>Wideband CQI (4bit)+subband CQI (2bit)<br>when RI>1, CQI of first codeword | Mode 3-1: Single PMI<br>RI<br>$1^{st}$ wideband CQI (4bit)+subband CQI (2bit)<br>$2^{nd}$ wideband CQI (4bit)+subband CQI (2bit) if RI>1<br>Wideband PMI |

PUSCH CQI feedback type

FIG. 9

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-loop SM) ]<br>One wideband CQI (4bit) ]<br>when RI>1, CQI of first codeword | Mode 1-1<br>RI ]<br>Wideband CQI (4bit)<br>Wideband spatial CQI (3bit) for RI>1 ]<br>Wideband PMI (4bit) ] |
| | UE Selected | Mode 2-0<br>RI (only for Open-loop SM) ]<br>Wideband CQI (4bit) ]<br>Best-1 CQI (4bit) in each BP<br>Best-1 indicator (L-bit label) ]<br>when RI>1, CQI of first codeword | Mode 2-1<br>RI ]<br>Wideband CQI (4bit)<br>Wideband spatial CQI (3bit) for RI>1 ]<br>Wideband PMI (4bit) ]<br>Best-1 CQI (4bit) 1 in each BP<br>Best-1 spatial CQI (3bit) for RI>1 ]<br>Best-1 indicator (L-bit label) ] |

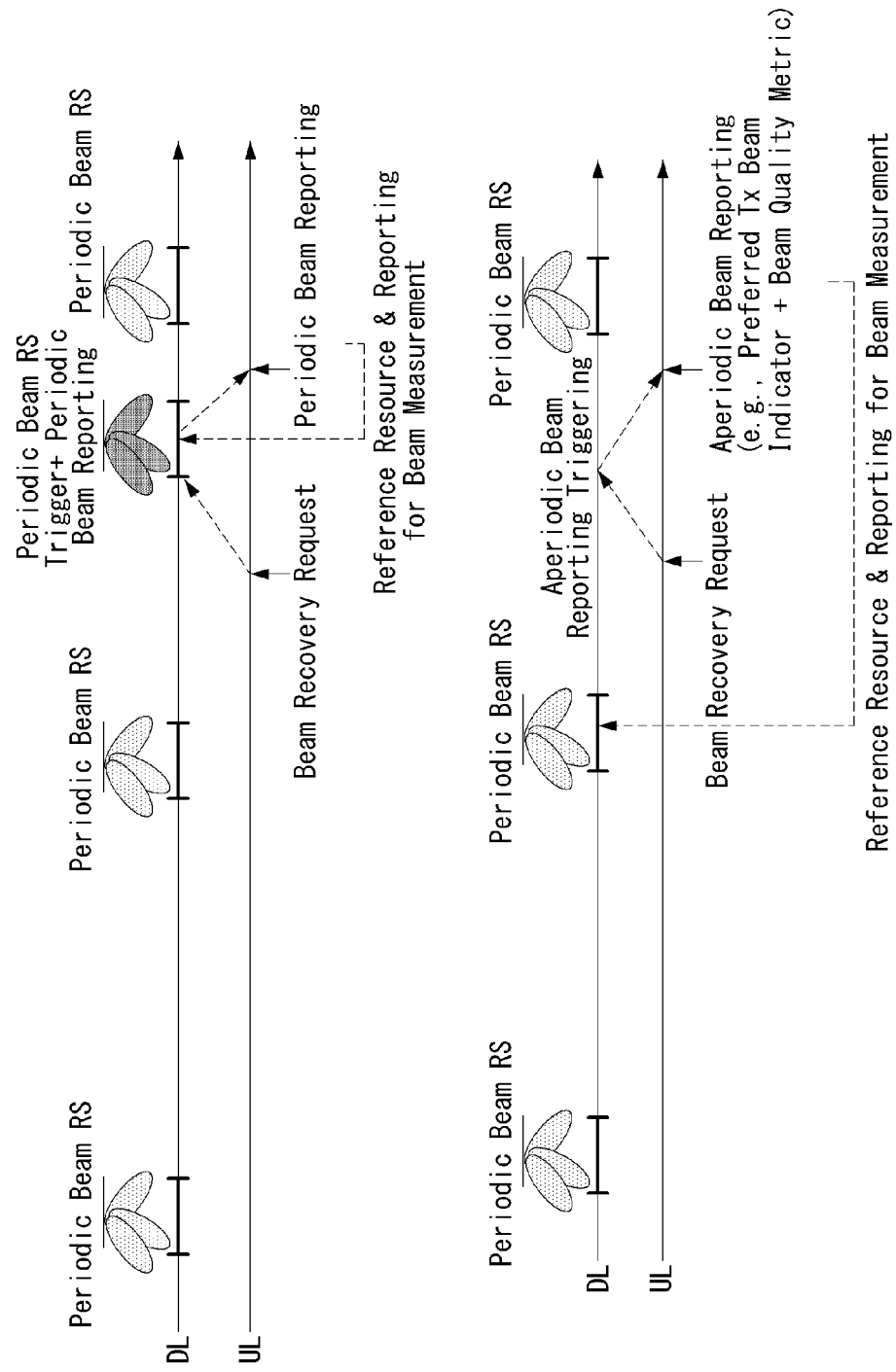

METHOD FOR RECOVERING BEAM IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/009084, filed on Aug. 21, 2017, which claims the benefit of U.S. Provisional Application No. 62/469,507, filed on Mar. 9, 2017. The disclosures of the prior applications are incorporated by reference in their entirety.

TECHNICAL FIELD

The present disclosure relates to a wireless communication system, and more particularly to a method for performing beam recovery and a device for supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present specification is to provide a method for providing a method for performing beam recovery by transmitting a beam recovery request message when a beam failure event occurs due to movement of a UE or the like.

In addition, the present specification is to provide a method for informing whether there is a replacement beam to an eNB and thereby performing, by the eNB, triggering of aperiodic beam RS and/or aperiodic beam reporting.

Technical objects to be achieved in the present disclosure are not limited to the aforementioned technical objects, and other technical objects not described above may be evidently understood by a person having ordinary skill in the art to which the present disclosure pertains from the following description.

Technical Solution

In one general aspect, there is provided a method for performing beam recovery in a wireless communication system, the method which is performed by a user equipment (UE) and includes: receiving a beam reference signal (BRS) used for beam management from an enhanced Node B (eNB); when a beam failure event is detected, transmitting a control signal for a beam failure recovery request to the eNB; and, when beam reporting is triggered, reporting a beam measurement result to the eNB in a specific resource, wherein the control signal comprises indication information indicating whether there is replacement beam, wherein the replacement beam is a reference signal having a channel quality greater than a specific channel quality among reference signals configured for the beam management.

The indication information may be information on a preferred link associated with a preset aperiodic beam reporting setting, information on a preferred resource setting associated with a preset aperiodic beam reporting setting, or information on a preferred resource set associated with a preset aperiodic beam reporting setting.

The control signal uses a time resource identical to a physical random access channel (PRACH), and the control signal may be code-division-multiplexed (CDM) or frequency-division-multiplexed (FDM) with the PRACH in the time resource.

The control signal may be transmitted through a physical uplink control channel (PUCCH), and the control signal may use different time/frequency resources, different sequence sets, and/or different uplink control information (UCI) according to whether there is the replacement beam.

The different sequence sets may be discriminated by a root sequence index or a cyclic shift value.

The method may further include receiving, from the eNB, an indication message indicating triggering of the beam reporting, and the beam reporting may be triggered based on the indication message.

The indication message may include at least one of the following: information on a valid or invalid link among settings pre-associated as measurement settings, information on a valid or invalid resource setting among settings pre-associated as measurement settings, information on a valid or invalid resource set among settings pre-associated as measurement settings, and beam reporting mode setting information.

In the measurement setting, one reporting setting and two resource settings may be connected via a link or one reporting setting and one resource setting may be connected via a link.

The beam reporting mode setting information may be a first mode, where aperiodic reference signal transmission and aperiodic beam reporting are triggered together, or a second mode where only aperiodic beam reporting is triggered.

When the beam reporting mode setting information is set to the first mode, the specific resource may be an aperiodic resource setting or aperiodic resource setting among resource settings or resource sets configured by radio resource control (RRC).

The specific resource may be a resource that is activated in a slot identical to a slot which receives the indication message or activated after the slot which receives the indication message.

When the beam reporting mode setting information is set to the second mode, the specific resource may be a periodic or semi-persistent resource setting or resource set among resource settings or resource sets configured by RRC.

The specific resource may be a resource that is activated before a slot which receives the indication message.

In another general aspect, there is provided a user equipment (UE) for performing beam recovery in a wireless communication system, the UE including: a radio frequency (RF) module configured to transmit and receive radio signals; a processor functionally connected to the RF module, wherein the processor is configured to: receive a beam reference signal (BRS) used for beam management from an enhanced Node B (eNB); when a beam failure event is detected, transmit a control signal for a beam failure recovery request to the eNB; and, when beam reporting is triggered, report a beam measurement result to the eNB in a specific resource, wherein the control signal comprises indication information indicating whether there is replacement beam, and wherein the replacement beam is a reference signal having a channel quality greater than a specific channel quality among reference signals configured for the beam management.

Advantageous Effects

The present specification defines a beam recovery process upon occurrence of a beam failure event, thereby addressing a beam block problem which occurs due to movement of a UE or the like.

In addition, the present specification have an advantageous effect in efficiently performing beam recovery by notifying an enhanced Node B (eNB) of whether there is a replacement beam of the UE and thereby performing a different operation by the eNB.

Effects which may be obtained in the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 8 is a diagram showing an example of a PUSCH CSI reporting mode.

FIG. 9 is a diagram showing a PUCCH CSI reporting mode.

FIG. 10 shows an example of a network operation proposed in the specification according to whether there is a replacement beam.

MODE FOR INVENTION

Figure 1:
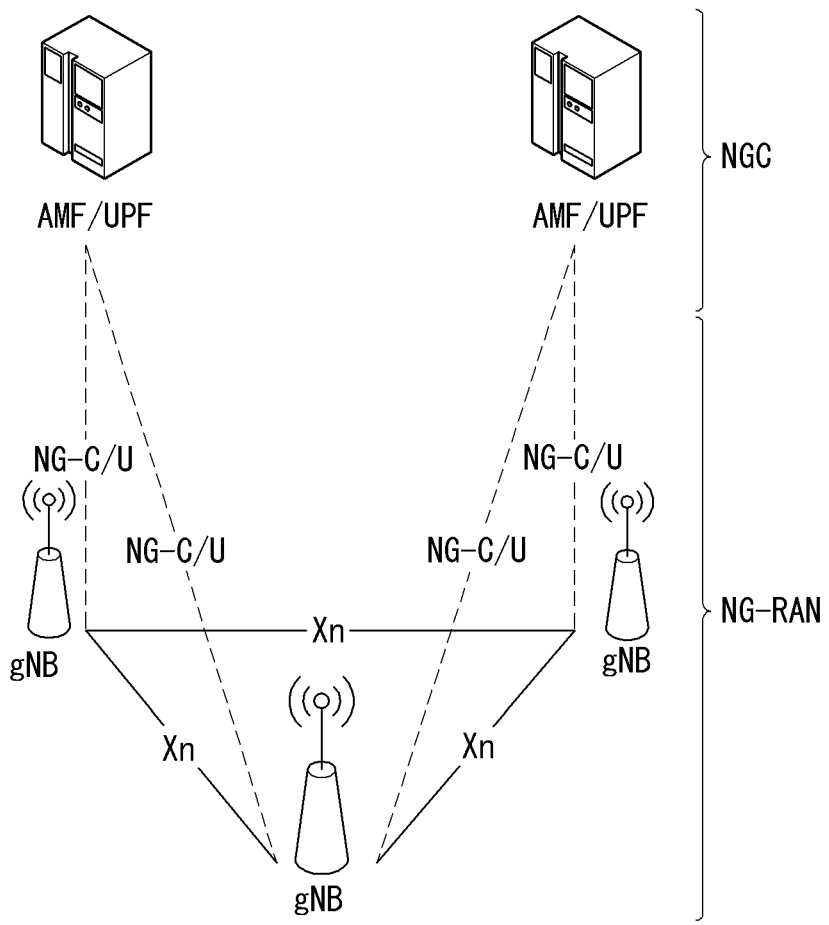
FIG. 1 is a diagram showing an example of a system structure of New Rat (NR) to which a method proposed in the present disclosure can be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC- FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definitions of Terms eLTE eNB: eLTE eNB is an evolution of an eNB which supports a connection to EPC and NGC.

gNB: A node which supports not only a connection to NGC but also NR.

New RAN: A wireless access network which supports NR or E-UTRA or interacts with NGC.

Network slice: A network slice is a network defined by an operator to provide a solution optimized to a specific market scenario requiring specific requirements together with an end-to-end scope.

Network function: A network function is a logical node within network infrastructure having a well-defined external interface and a well-defined functional operation.

NG-C: A control plane interface used for an NG2 reference point between a new RAN and NGC.

NG-U: A user plane interface used for an NG3 reference point between a new RAN and NGC Non-standalone NR: A disposition configuration by which a gNB requires an LTE eNB as an anchor to establish a control plane connection to an EPC or by which a gNB requires an eLTE eNB as an anchor to establish a control plane connection to an NGC.

Non-standalone E-UTRA: A disposition configuration which requires a gNB as an anchor to establish a control plane connection to an NGC.

User plane gateway: An end-point of the NG-U interface.

System in General

FIG. 1 illustrates one example of the overall system structure of an NR to which a method proposed by the present specification may be applied.

Referring to FIG. 1, an NG-RAN is composed of an NG-RA user plane (a new AS sublayer/PDCP/RLC/MAC/PHY) and gNBs providing control plane (RRC) protocol endpoints for User Equipment (UE).

The gNBs are inter-connected through an Xn interface.

The gNBs are also connected to the NGC through the NG interface.

More specifically, the gNBs are connected to Access and Mobility Management Functions (AMFs) through the N2 interface and to User Plane Functions (UPFs) through the N3 interface.

NR (New Rat) Numerology and Frame Structure

In a NR system, a plurality of numerologies may be supported. Here, a numerology may be defined by a subcarrier spacing and CP overhead. A plurality of subcarrier spacings may be derived by scaling a basic subcarrier spacing by an integer N (or, μ). In addition, a numerology used may be selected independently of a frequency band although it is assumed that a very low subcarrier spacing is not used in a very high carrier frequency.

In addition, various frame structures according to a plurality of numerologies may be supported in the NR system.

Hereinafter, an orthogonal frequency division multiplexing (OFDM) numerology and a frame structure, which can be considered in the NR system, will be described.

The number of OFDM numerologies supported in the NR system may be defied as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In regard to a frame structure in the NR system, a size of various fields in a time domain is expressed as a multiple of a time unit of $T_s=1/(\Delta f_{max} \cdot N_f)$. Here, $\Delta \Delta f_{max}=480 \cdot 10^3$ and $N_f=4096$. Downlink and uplink transmissions are organized into radio frames having a duration of $T_f=(\Delta f_{max} N_f/100) \cdot T_s=10$ ms. Here, the radio frame consists of ten subframes each having a duration of $T_{sf}=(\Delta f_{max} N_f/1000) \cdot T_s=1$ ms. In this case, there may be one set of frames in the uplink and one set of frames in the downlink.

Figure 2:
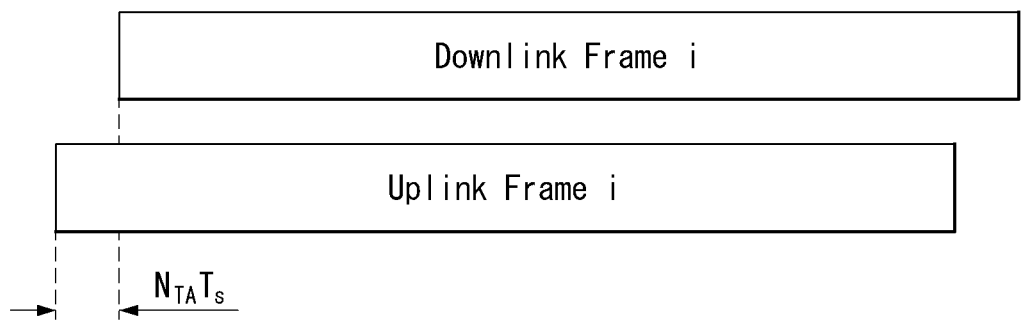
FIG. 2 shows a relationship between an uplink frame and a downlink frame in a wireless communication system to which a method proposed in the present disclosure can be applied.

FIG. 2 illustrates a relation between an uplink frame and a downlink frame in a wireless communication system to which a method proposed by the present specification is applicable.

As illustrated in FIG. 2, the transmission of an uplink frame number i from a user equipment (UE) needs to start $T_{TA}=N_{TA}T_s$ before the start of a corresponding downlink frame at the UE.

Regarding the numerology μ, slots are numbered in increasing order of $n_s^\mu \in \{0, \ldots, N_{subframe}^{slots,\mu}-1\}$ in a subframe and are numbered in increasing order of $n_{s,f}^\mu \in \{0, \ldots, N_{frame}^{slots,\mu}-1\}$ in a radio frame. One slot is composed of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In regard to physical resources in the NR system, an antenna port, a resource grid, a resource element, a resource block, a carrier part, etc. may be considered.

Hereinafter, the above physical resources possible to be considered in the NR system will be described in more detail.

First, in regard to an antenna port, the antenna port is defined such that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be said to be in a quasi co-located or quasi co-location (QC/QCL) relation. Here, the large-scale properties may include at least one of delay spread, Doppler spread, frequency shift, average received power, and received timing.

Figure 3:
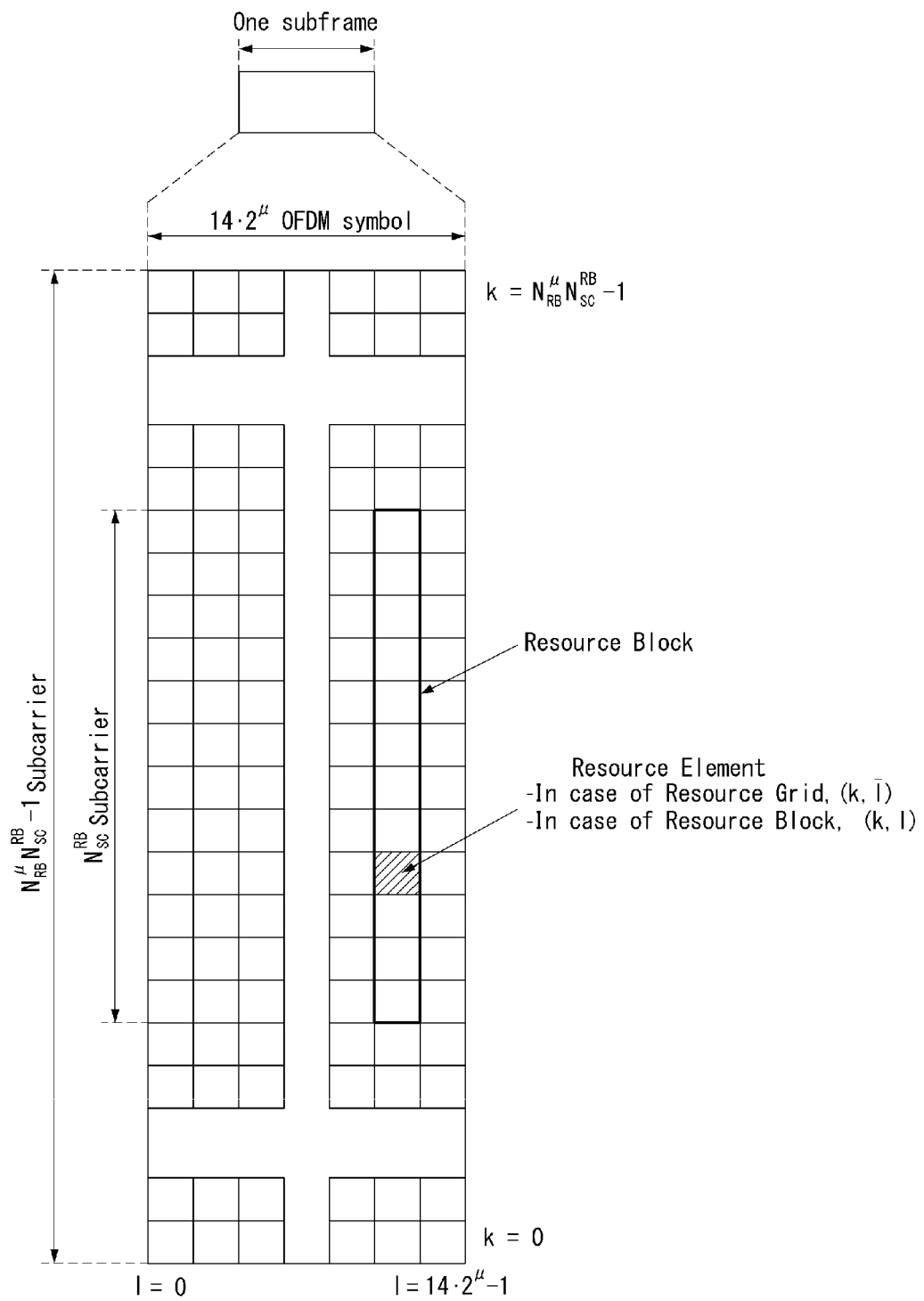
FIG. 3 shows an example of a resource grid supported by a wireless communication system to which a method proposed in the present disclosure can be applied.

FIG. 3 illustrates an example of a resource grid supported in a wireless communication system to which a method proposed by the present specification is applicable.

Referring to FIG. 3, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols. Here, $N_{RB}^{\mu} \leq N_{RB}^{max,\mu}$. The $N_{RB}^{max,\mu}$ represents a maximum transmission bandwidth and may change not only between numerologies but also between uplink and downlink.

Figure 4:
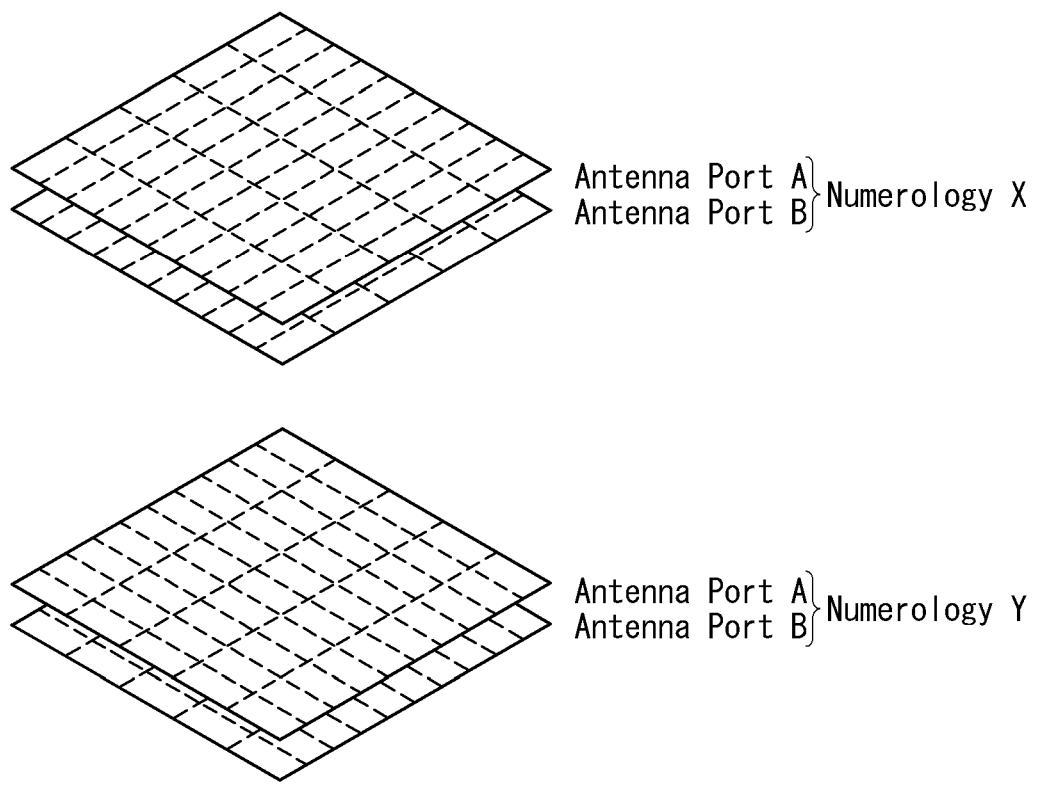
FIG. 4 shows examples of a resource grid per antenna numerology to which a method proposed in the present disclosure can be applied.

In this case, as illustrated in FIG. 4, one resource grid may be configured per the numerology μ and an antenna port p.

FIG. 4 illustrates examples of resource grids for each antenna port and numerology to which a method proposed by the present specification is applicable.

Each element of the resource grid for the numerology μ and the antenna port p is called a resource element and is uniquely identified by an index pair (k,l). Here, k=0, ..., $N_{RB}^{\mu} N_{sc}^{RB}-1$ is an index in a frequency domain, and l=0, ..., $2^{\mu} N_{symb}^{(\mu)}-1$ refers to a location of a symbol on a subframe. The index pair (k,l) is used to refer to a resource element in a slot. Here l=0, ..., $N_{symb}^{\mu}-1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

In addition, a physical resource block is defined as $N_{sc}^{RB}=12$ consecutive subcarriers in the frequency domain. On the frequency domain, physical resource blocks are numbered from 0 to $N_{RB}^{\mu}-1$. A relation between a physical resource block number $n_{PRB}$ in the frequency domain and the resource elements (k,l) may be given by Equation 1.

$$n_{PRB} = \left\lfloor \frac{k}{N_{sc}^{RB}} \right\rfloor \quad \text{[Equation 1]}$$

In regard to a carrier part, a UE may be configured to receive or transmit the carrier part using only a subset of a resource grid. In this instance, a set of resource blocks which the UE is configured to receive or transmit are numbered from 0 to $N_{URB}^{\mu}-1$ in the frequency domain.

Uplink Control Channel

Physical uplink control signaling should be able to at least carry hybrid-ARQ acknowledgment, CSI report (including beamforming information if possible), and a scheduling request.

At least two transmission methods are supported for the UL control channel supported by the NR system.

The uplink control channel may be transmitted around a last transmitted uplink symbol(s) of a slot in short duration. In this case, the uplink control channel is time-division-multiplexed and/or frequency-division-multiplexed with an uplink (UL) data channel in the slot. One-symbol unit transmission of the slot is supported with respect to the uplink control channel of the short duration.

Short uplink control information (UCI) and data are frequency-division-multiplexed at least between the UE and the UE in the case where the physical resource blocks (PRBs) for the short UCI and the data do not overlap.

In order to support time division multiplexing (TDM) of short PUCCH from different UEs in the same slot, a mechanism for notifying to the UE whether the symbol(s) in the slot to transmit the short PUCCH is supported at least at 6 GHz or more is supported.

With respect to 1-symbol duration, supported at least are 1) that when a reference signal (RS) is multiplexed, the UCI and the RS is multiplexed to a given OFDM symbol by a frequency division multiplexing (FDM) scheme and 2) that subcarrier spacings between downlink (DL) and uplink (UL) data and the short duration PUCCH are the same as each other in the same slot.

At least, the short duration PUCCH during 2-symbol duration is supported. In this case, the subcarrier spacings between the downlink (DL) and uplink (UL) data and the short duration PUCCH are the same as each other in the same slot.

At least, a semi-static configuration is supported, in which a PUCCH resource of the UE given in the slot, that is, short PUCCHs of different UEs may be time-division-multiplexed within given duration.

The PUCCH resource includes a time domain and a frequency domain and if applicable, the PUCCH resource includes a code domain.

The short duration PUCCH may be extended to the end of the slot from the viewpoint of the UE. In this case, after the short duration PUCCH, an explicit gap symbol is not required.

In regard to a slot (that is, a DL-centric slot) having a short UL part, when data is scheduled in a short uplink part, 'short UCI' and data may be frequency-division-multiplexed by one UE.

The uplink control channel may be transmitted over multiple uplink symbols during long duration in order to improve coverage. In this case, the uplink control channel is frequency-division-multiplexed with the uplink data channel in the slot.

At least, a UCI carried by a long duration UL control channel may be transmitted in one slot or multiple slots by a design with a low peak to average power ratio (PAPR).

Transmission using multiple slots is allowed for a total duration (e.g., 1 ms) in at least some cases.

For the long duration uplink control channel, time division multiplexing (TDM) between the RS and the UCI is supported with respect to DFT-S-OFDM.

The long UL part of the slot may be used for transmitting the long duration PUCCH. That is, the long duration PUCCH is supported with respect to both a UL-only slot and a slot having symbols of a variable number constituted by a minimum of four symbols.

At least with respect to a 1 or 2-bit UCI, the UCI may be repeated in N (N>1) slots and the N slots may be adjacent or not adjacent in slots in which the long duration PUCCH is allowed.

At least, simultaneously transmission of the PUSCH and the PUCCH is supported with respect to a long PUCCH. That is, even when there is data, the uplink control for the PUCCH resource is transmitted. Further, in addition to the simultaneous transmission of the PUCCH and the PUSCH, the UCI in the PUSCH is supported.

Intra-TTI slot frequency hopping is supported.

A DFT-s-OFDM waveform is supported.

A transmit antenna diversity is supported.

TDM and FDM between the short duration PUCCH and the long duration PUCCH are supported for other UEs in at least one slot. In the frequency domain, the PRB (or multiple PRBs) is the minimum resource unit size for the UL control channel. When hopping is used, frequency resources and hopping may not spread to a carrier bandwidth. Further, a UE-specific RS is used for NR-PUCCH transmission. A set of PUCCH resources is configured by higher layer signaling and the PUCCH resources within the configured set is indicated by downlink control information (DCI).

As part of the DCI, the timing between data reception and hybrid-ARQ acknowledgment transmission should be dynamically (at least together with RRC) indicated. A combination of the semi-static configuration and dynamic signaling (for at least some types of UCI information) is used to determine the PUCCH resource for 'long and short PUCCH formats'. Here, the PUCCH resource includes the time domain and the frequency domain and, if applicable, the PUCCH resource includes the code domain. Using UCI on the PUSCH, that is, a part of the scheduled resource for the UCI is supported in the case of simultaneous transmission of the UCI and the data.

Further, at least a single HARQ-ACK bit uplink transmission is supported at least. In addition, a mechanism is supported, which enables the frequency diversity. Further, in the case of Ultra-Reliable and Low-Latency Communication (URLLC), a time interval between scheduling (SR) resources configured for the UE may be smaller than one slot.

Beam Management

Beam management in an RN system is defined as below.

Beam Management: as a set of L1/L2 processes for acquiring and maintaining a set of TRP(s) and/or UE beams which can be used for DL and UL transmission and reception, at least the following is included Beam determination: an operation in which a TRP(s) or the UE selects a transmitted/received beam of its own Beam measurement: an operation in which a TRP(s) or the UE measures a received beamforming signal Beam reporting: an operation in which the UE reports information on a beamformed signal based on beam measurement.

Beam sweeping: an operation in which a spatial domain is covered using a transmitted and/or received beam during a time interval by a predetermined method In addition, Tx/Rx beam correspondence in a TRP and the UE is defined as below.

Tx/Rx beam correspondence in a TRP is maintained when at least one of the following is satisfied.

TRP may determine a TRP Rx beam for DL reception based on DL measurement of the UE for one or more Tx beams of the TRP.

TRP may determine TRP Tx beam for DL transmission based on UL measurement of the TRP for one or more Rx beams of the TRP.

Tx/Rx beam correspondence in the UE is maintained when at least one of the following is satisfied.

The UE may determine a UE Tx beam for UL transmission based on DL measurement of the UE for one or more Rx beams of the UE.

The UE may determine a UE Rx beam for DL reception based on indication of a TRP based on UL measurement for one or more Tx beams.

TRP supports performance indication of UE beam correspondence-related information.

The following DL L1/L2 beam management process is supported in a single TRP or a plurality of TRPs.

P-1: It is used to enable UE measurement for different beams in order to support selection of TRP Tx beam/UE Rx beam(s)

In the case of beamforming in TRP, different beam sets generally includes intra/inter-TRP Tx beam sweep. For beamforming in the UE, it generally includes UE Rx beam sweep from different beam sets.

P-2: UE measurement for different TRP Tx beams is used to change inter/intra-TRP Tx beam(s).

P-3: Measurement for the same TRP Tx beam is used to change UE Tx beam when the UE uses beamforming.

Aperiodic reporting triggered by at least a network is supported in operations related to P-1, P-2, and P-3.

UE measurement based on an RS for beam management (at least CSI-RS) is comprised of K (total number of beams) beams, and the UE reports a measurement result of N number of selected Tx beams. Here, N is not necessarily a fixed number. A process based on an RS for mobility is not excluded. Reporting information includes information indicating a measurement quality for N beam(s), wherein at least N<K, and N DL Tx beams. In particular, the UE may report N' CRI (CSI-RS resource indicator) for K'>1 Non-Zero-Power (NZP) CSI-RS resources.

For beam management, the UE may be configured with higher layer parameters, as below.

N≥1 reporting setting, M≥1 resource setting

Links between reporting setting and resource setting are set in an agreed CSI measurement setting.

CSI-RS based P-1 and P2 are supported by resource and reporting setting.

P-3 may be supported regardless of reporting setting.

Reporting setting including at least the following.

Information including a selected beam

L1 measurement reporting

Time domain operation (e.g., aperiodic operation, periodic operation, and a semi-persistent operation)

frequency granularity in the case where various frequency granularities are supported Resource setting including at least the following Time domain operation (e.g., aperiodic operation, periodic operation, semi-persistent operation)

RS type: at least NZP CSI-RS

At least one CSI-RS resource set, each CSI-RS resource set, include K>1 RS resources (some parameters of K CSI-RS resources may be identical. For example, port number, time domain operation, density, and period).

In addition, NR supports the following beam reporting in consideration of L group wherein L>1.

Information indicating minimum groups

Measurement quantity for N1 beam (L1RSRP and CSI reporting supported) (when CSI-RS is used to acquire CSI)

When applicable, information indicating NI DL Tx beams.

As described above, group-based beam reporting may be configured on the basis of a UE unit. In addition, the group-based beam reporting may be turned off on the basis of a UE unit. (e.g., when L=1 or NI=1).

NR may trigger a mechanism recovered from the UE from a beam failure.

A beam failure event occurs when quality of a beam pair link of an associated control channel is low enough (e.g., comparing with a threshold value, tie-out of an associated timer). A mechanism recovered from a beam failure (or error) is triggered when a beam error occurs.

A network is explicitly configured for a UE having resources for transmitting a UL signal for a recovery purpose. Configuration of the resources is supported in a point where an eNB is listening from all or some directions (e.g., random access).

A UL Tx/resource reporting a beam error may be located in a time instance identical to a PRACH (a resource orthogonal to a PRACH) or in an instance different from the PRACH (able to be configured for the UE). Transmission of a DL signal may be supported to enable the UE to monitor a beam in order to identify new potential beams.

NR supports beam management regardless or beam-related indication. When beam-related indication is provided, information about UE-sided beam forming used for CSI-RS based measurement/reception processing may be indicated to the UE through QCL. As a QCL parameter to be supported in the NR, not just parameters regarding delay, Doppler, average gain, and the like used in the LTE system, but also a spatial parameter for beamforming at a Tx end are scheduled to be added, and an angle-of-arrival related parameters in light of UE Rx beamforming and an angle-of-departure related parameters in light of an eNB Rx beamforming may be included. The NR supports using the same beams or different beams in control channel and corresponding data channel transmission.

To transmit an NR-PDCCH supporting robustness for beam pair blocking, the UE may be configured to monitor the NR-PDCCH on M beam pair links at the same time. Here, M≥1 and a maximum value of M depend on at least UE capability.

The UE may be configured to monitor an NR-PDCCH on different beam pair link(s) in different NR-PDCCH OFDM symbols. A parameter related to UE beam setting to monitor the NR-PDCCH on the multiple beam pair links may be configured through higher layer signaling or by MAC CE and/or may be considered in search space design.

At least, the NR supports indication of a space QCL assumption between DL RS antenna port(s) and DL RS antenna port(s) for demodulation of a DL control channel. A candidate signaling method for beam indication for the NR-PDCCH (that is, a method of a configuration for monitoring the NR-PDCCH) is a combination of MAC CE signaling, RRC signaling, DCI signaling, spec transparent and/or implicit method, and a combination of methods for signaling the above.

To receive a unicast DL data channel, the NR supports indication of a space QCL assumption between a DL RS antenna port and a DMRS antenna port of a DL data channel.

Information indicating the RS antenna port is displayed through DCI (downlink grant). In addition, this information indicates an RS antenna port which is QCL with a DMRS antenna port. Different sets of DMRS antenna ports for a DL data channel may be expressed as being QCL with different sets of the RS antenna ports.

Hybrid Beamforming

Existing beamforming technology using multiple antennas may be roughly divided into analog beamforming technology and digital beamforming technology according to location, to which a beamforming weight vector/precoding vector is applied.

The analog beamforming method is a representative beamforming method applied to an initial multi-antenna structure. The analog beamforming method may refer to a technique which divides an analog signal subjected to digital signal processing into a plurality of paths and performs beamforming through a phase shifter (PS) and a power amplifier (PA) of each path.

For analog beamforming, an analog signal derived from a single digital signal needs to be processed by a PA and a PS connected to each antenna. That is, in an analog stage, a complex weight is processed by the PS and the PA.

Figure 5:
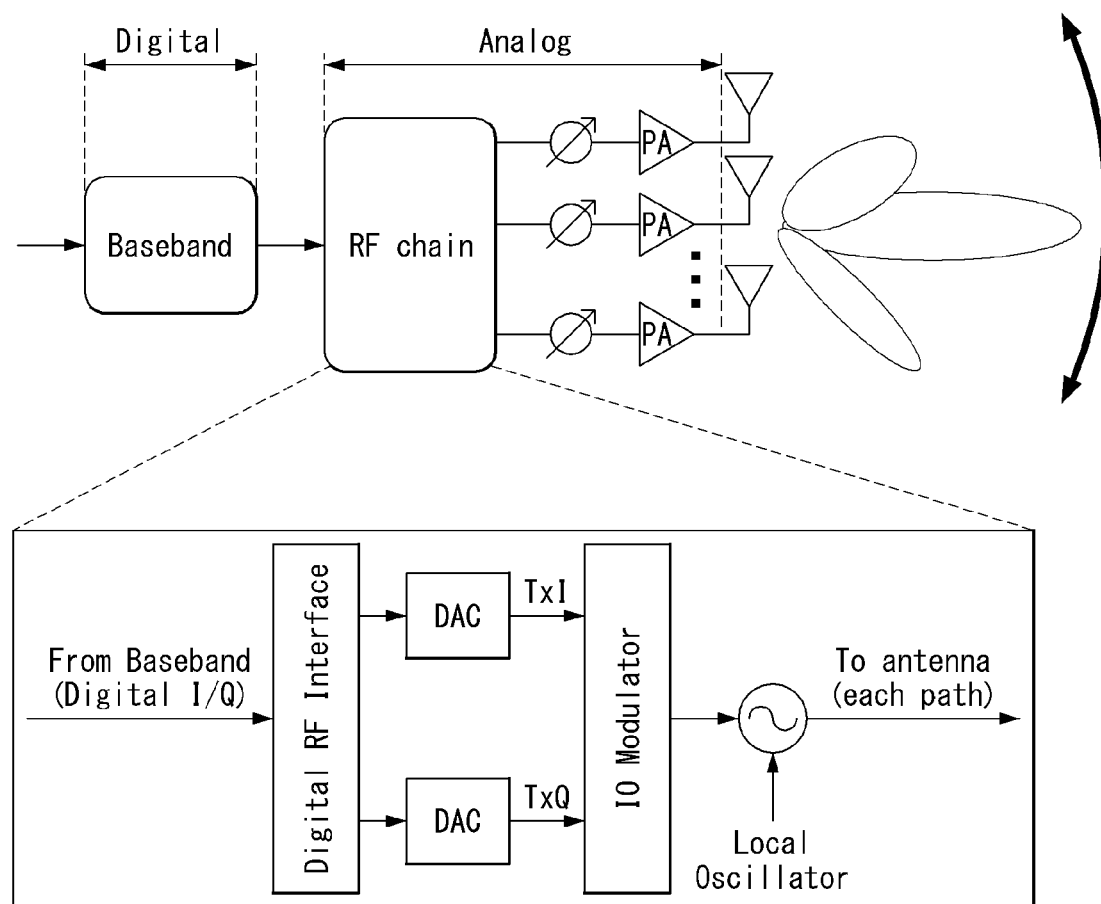
FIG. 5 shows an example of a block diagram of an analog beamformer and a transmitter configured as an RF chain.

FIG. 5 shows an example of a block diagram of a transmitter composed of an analog beamformer and an RF chain. FIG. 5 is illustrated merely for convenience of explanation and does not limit the scope of the present disclosure.

In FIG. 5, a radio frequency (RF) chain means a processing block for converting a baseband (BB) signal into an analog signal and the configuration thereof is shown in FIG. 2. In the analog beamforming method, beamforming accuracy is determined according to device characteristics of the PS and the PA, and the analog beamforming method may be advantageous in narrowband transmission due to control characteristics of the devices.

In addition, in the analog beamforming method, due to a hardware structure in which it is difficult to implement multiple stream transmission, multiplexing gain for increasing a transfer rate is relatively low. In this case, it may be difficult to perform beamforming per UE based on orthogonal resource assignment.

In contrast, in the digital beam forming method, beamforming is performed in a digital stage using a BB process in order to maximize diversity and multiplexing gain in a multiple input multiple output (MIMO) environment.

Figure 6:
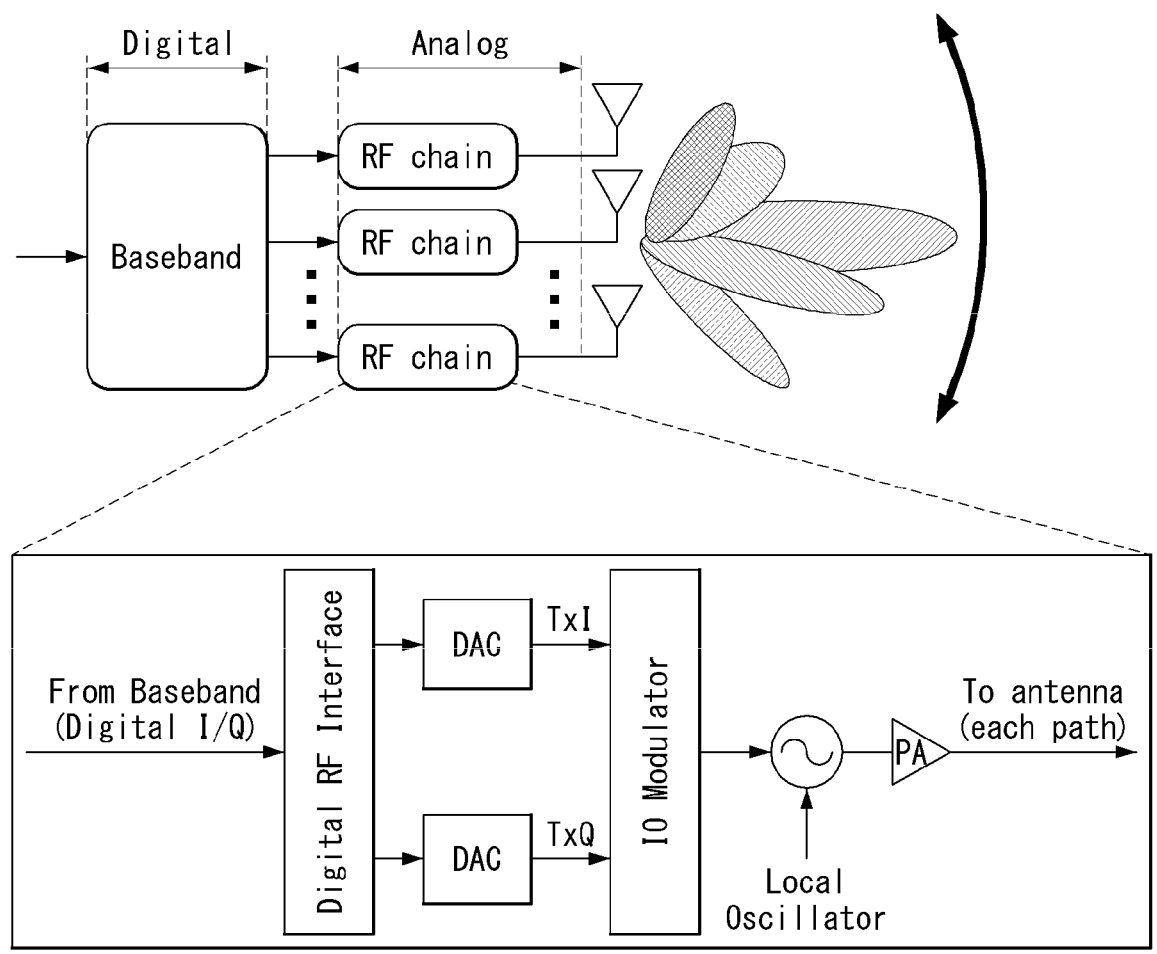
FIG. 6 shows an example of a block diagram of a digital beamformer and a transmitter configured as an RF chain.

FIG. 6 is a block diagram showing a transmitter including a digital beamformer and a radio frequency (RF) chain. FIG. 6 is illustrated merely for convenience of explanation and does not limit the scope of the present disclosure.

In the case of FIG. 6, precoding may be performed in a BB process such that beamforming is possible. Here, an RF chain includes a PA. It is because a complex weight derived for beamforming is directly applied to transmitted data.

In addition, since beamforming can be differently performed per user, it is possible to support simultaneous beamforming for multiple users. Besides, since beamforming is independently performed per user, to which orthogonal resources are assigned, scheduling flexibility is high and a transmission end suiting a system purpose can be employed. In addition, if MIMO-orthogonal frequency division multiplexing (OFDM) technology is applied in a broadband transmission environment, it is possible to form an independent beam per subcarrier.

Accordingly, the digital beamforming method can optimize a maximum single user transfer rate based on enhanced beam gain and system capacity enhancement. Based on the above-described characteristics, in a current 3G/4G system, digital beamforming based MIMO technology has been introduced.

In the NR system, a massive MIMO environment where the number of transceiving antennas increases significantly may be considered. In general, in cellular communications, the maximum number of transceiving antennas applied to the MIMO environment is assumed to be 8. However, as the massive MIMO environment is considered, the number of transceiving antennas may increase to few dozens or few hundreds.

In this case, if the above-described digital beamforming technique is applied to the massive MIMO environment, the transmitter needs to perform signal processing for hundreds of antennas through a BB process for digital signal processing. Accordingly, complexity of the signal processing increases greatly, and RF chains are needed as much as the antennas, and therefore, a complexity of hardware embodiment may increase greatly.

In addition, the transmitter needs to perform independent channel estimation for every antenna. In addition, in the FDD system, since the transmitter needs feedback information on a massive MIMO channel comprised of all antennas, a pilot and/or feedback overhead may increase greatly.

On the other hand, if the above-described analog beamforming technique is applied to the massive MIMO environment, a hardware complexity of the transmitter is relatively low.

On the contrary, enhancement in performance using a plurality of antennas is very low, and a flexibility of resource allocations may be lowered. In particular, in the broadband transmission, it may not be easy to control a beam per frequency.

Therefore, in the massive MIMO environment, a hybrid-type configuration of the transmission is required, in which the analog beamforming structure and the digital beamforming structure are combined, rather than a configuration of the transmitter in which one of the analog beamforming structure and the digital beamforming structure is selected.

Analog Beam Scanning

In general, analog beamforming may be employed by a pure analog beamforming transceiver and a hybrid beamforming transceiver. At this point, analog beam scanning may enables estimation on a single beam for the same time. Hence, a training time required for beam scanning is proportional to the total beam candidate number.

As described above, in the analog beamforming, a beam scanning process in the time domain is necessarily required for transceiver beam estimation. At this point, the estimation time ts for all transceived beams may be represented as Equation 2 as below.

$$T_s = t_s \times (K_T \times K_R) \quad \text{[Equation 2]}$$

In Equation 2, ts denotes a time required for one beam scanning, KT denotes the number of transmitted beams, and KR denotes the number of received beams.

Figure 7:
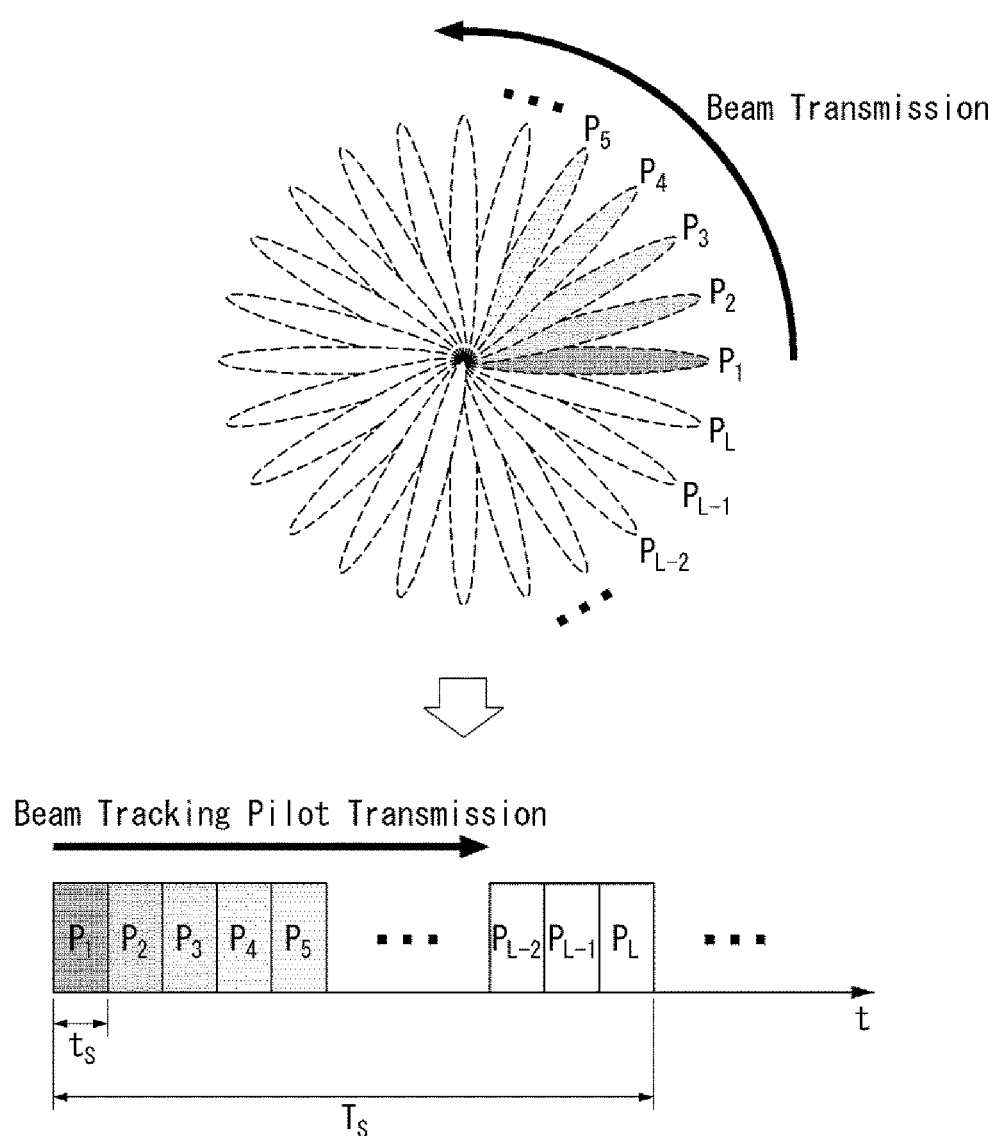
FIG. 7 shows an example of an analog beam scanning method according to various embodiments of the present disclosure.

FIG. 7 shows an example of an analog beam scanning method according to various embodiments of the present disclosure. FIG. 7 is illustrated merely for convenience of explanation and does not limit the scope of the present disclosure.

In the case of FIG. 7, the total number of transmitted beam r KT is L and the total number of received beam number KR is 1. In this case, the total number of candidate beams is L, and hence, time intervals L are required in a time domain.

In other words, for analog beam estimation, 1 beam estimation is possible in a single time interval, and thus, as shown in FIG. 7, L time intervals are required for total L beam estimations (P1 to PL). After the analog beam estimation process is finished, the UE feeds back identifier (e.g., ID) of a beam having the strongest signal intensity to the eNB. That is, as the individual beam number increases more due to the increasing transceiving antenna number, a longer training time may be required.

Since analog beamforming changes a size and phase angle of a continuous waveform of a time domain after DAC, a training interval for an individual beam should be secured unlike digital beamforming. Therefore, the longer the length of the training interval becomes, the less the efficiency of a system is reduced (that is, the loss of a system increases).

Channel State Information (CSI) Feedback

In most of the cellular system including the LTE system, a UE receives a pilot signal or reference signal for channel estimation from an eNB to calculate CSI and reports the calculated CSI to the eNB.

The eNB transmits a data signal based on the CSI fed back from the UE.

The CSI fed back from the UE in the LTE system includes CQI (channel quality information), PMI (precoding matrix index), and RI (rank indicator).

CQI feedback is radio channel quality information reported for a purpose to provide a guide whether to apply a modulation and coding scheme (MCS) when the eNB transmits data (for a purpose of link adaptation).

If channel quality between the eNB and the UE is high, the UE may feed back a high CQI value, whereby the eNB will transmit data by applying a relatively high modulation order and a low coding rate: on the contrary, the UE may feed back a low CQI value, whereby the eNB will transmit data by applying a relatively low modulation order and a high coding rate.

PMI feedback is preferred precoding matrix information that is provided to the eNB to provide a guide which MIMO precoding scheme is to be applied if the eNB installs multiple antennas.

The UE estimates a downlink MIMO channel between the eNB and the Ue from the reference signal and therefore recommends a MIMO precoding scheme to be applied by the eNB through PMI feedback.

In the LTE system, only a linear MIMO precoder that can be expressed in the form of a matrix is considered in PMI configuration.

The eNB and the UE share a codebook comprised of a plurality of precoding matrixes, and each MIMO precoding matrix within the codebook has a unique index.

Therefore, the UE minimizes the amount of feedback information by feeding back an index corresponding to the most preferred MIMO precoding matrix within the codebook.

The PMI value is not necessarily comprised of one index. For example, in the case where the number of transmitter antenna ports is 8 in the LTE system, it is configured such that a final 8tx MIMO precoding matrix can be derived only when two indexes (first PMI & second PMI) are combined.

The RI feedback is information on the number of preferred transport layers provided to the eNB to provide a guide as to the number of transport layers preferred by the UE if multiple antennas are installed in the eNB and the UE and thus multi-layer transmission is enabled through spatial multiplexing.

RI is highly associated with PMI. It is because the eNB should be aware of which precoding needs to be applied to each layer according to the number of transport layers.

When it comes to PMI/RI feedback configuration, a feedback may be enabled by defining PMI for each layer after configuring a PMI codebook with reference to single layer transport, but this method has a drawback in that the amount of PMI/RI feedback information increases greatly due to increase in the number of transport layers.

Thus, in the LTE system, PMI for each number of transport layers is defined in the LTE system. That is, for R-layer transmission, N number of NT×R matrixes is defined in a codebook (here, R denotes the number of layers, NT denotes the number of transmitting antenna ports, and N denotes a size of the codebook).

Thus, in the LTE system, a size of a PMI code book is defined regardless of the number of transport layers. As a result, since PMI.RI is defined in this configuration, the transport layer number (R) coincides with a rank value of a precoding matrix (Nt×R matrix) and thus the term of rank indicator (RI) is used.

PMI/RM used in the present specification is not limited to indicate an index value of a precoding matrix represented as NT×R matrix and a rank value of a precoding matrix, unlike PMI/RI in the LTE system.

PMI used in the present specification indicates information on a preferred MIMO precoder from among MIMO precoders that can be applied to the transmitter, and the form of the precoder is not limited to a linear precoder that can be represented in a matrix like in the LTE system. In addition, RI used in the present specification has a meaning wider than that of RI used in the LTE, and includes all feedback information indicating preferred transport layers numbers.

CSI information may be acquired in the entire system frequency domains or in some frequency domains, In particular, in the broadband system, it may be useful to acquire CSi information on some preferred frequency domains (e.g., subband) per UE and provide a feedback on the acquired CSI information.

In the LTE system, CSI feedback is performed through an uplink channel, and periodic CSI feedback is generally performed through a physical uplink control channel (PUCCH) whereas aperiodic CSI feedback is performed through a physical uplink shared channel (PUSCH) which is an uplink data channel.

The aperiodic CSI feedback refers to providing a feedback temporarily only when the eNB wants CSI feedback information, and, in this case, the eNB triggers the CSI feedback through a downlink control channel such as a PDCCH/ePDCCH.

In the LTE system, which information needs to be fed back by the UE when CSI feedback is triggered is identified from among PUSCH reporting modes as shown in FIG. 8, and which PUSCH CSI reporting mode the UE needs to operate is informed to the UE in advance through an uplink layer.

FIG. 8 is a diagram showing an example of a PUSCH CSI report mode.

A PUCCH CSI reporting mode for periodic CSI feedback through a PUCCH is defined as well.

FIG. 9 is a diagram showing an example of a PUCCH CSI report mode.

The PUCCH has a smaller payload size than the PUSCH, and thus it is difficult to transmit CSI information all at once.

Thus, a timing of transmitting CQI and PMI and a timing of transmitting RI differs on each reporting mode. For example, in reporting mode 1-0, RI is transmitted alone at a PUCCH transmission timing, and wideband CQI is transmitted at another PUCCH transmission timing. Depending on a type of CSI information configured at a specific PUCCH transmission timing, a PUCCH reporting type is defined. For example, in the above example, a reporting type in which RI is transmitted alone corresponds to type 3, and a reporting type in which wideband CQI is transmitted alone corresponds to type 4. A period and an offset value of RI feedback, and a period and an offset value of CQI/PMI feedback are set to the UE through an uplink message.

The CSI feedback information is included in uplink control information (UCI).

Reference Signals in LTE

In the LTE system, the use of a pilot or reference signal IRS) can be largely divided as below.

1. Measurement RS: pilot for channel state estimation

A. CSI measurement/reporting purpose (short term measurement): purposes of Link adaptation, rank adaptation, closed loop MIMO precoding, etc.

B. Long term measurement/reporting purpose: purposes of Handover, cell selection/reselection, etc.

2. Demodulation RS: pilot for physical channel reception

3. Positioning RS: pilot for UE location estimation

4. MBSFN RS: pilot for Multi-cast/Broadcast service

In LTE Rel-8, Cell-specific RS (CRS) is used for measurement (purpose 1A/B) and demodulation (purpose 2) for most downlink physical channels, but, in order to address an RS overhead problem caused by an increase in the number of antennas, since LTE Advance (Rel-10), a CSI-RS is used exclusively for CSI measurement (purpose 1A) and a UE-specific RS is used exclusively for reception of a downlink data channel (PDSCH).

The CSI-RS is an RS designed exclusively for CSI measurement and feedback, and characterized by having a RS overhead very low compared to CRS, and, while CRS supports four multiple antenna ports, the CSI-RS is designed to support eight multiple antenna ports at maximum. Since the UE-specific RS is designed exclusive for demodulation of a data channel, the UE-specific RS is an RS (pre-coded RS) to which the MIMO precoding technique applied in data transmission is applied to a pilot signal.

Accordingly, unlike CRS and CSI-RS, the UE-specific RS is not necessarily transmitted as many as the number of antenna ports, and the UE-specific RS in number as much as the number of transport layers (transport ranks) can be transmitted.

In addition, the UE-specific RS is transmitted through a scheduler of the eNB in a resource region identical to a data channel resource region assigned to each UE in order to receive a data channel of a corresponding UE, and thus, the UE-specific RS is an RS specific to a UE.

CRS is always transmitted in the same pattern in a system bandwidth so as to be used by every UE for measurement and demodulation, and thus, the CRS is specific to a cell.

In LTE UL, a Sounding RS (SRS) is designed as a measurement RS, and a Demodulation RS (DMRS) for an uplink data channel (PUSCH) are designed, and a DMRS for an uplink control channel (PUCCH) for ACK/NACK and CSI feedback is designed.

Beam Management and Beam Recovery

The eNB may request periodic CSI reporting, semi-persistent CSI reporting (which means that periodic CSI reporting is activated only during in a specific time period or continuous and multiple times of CSI reporting is performed), or aperiodic CSI reporting from the UE.

Here, in a period where the periodic and semi-persistent (SP) CSI reporting is activated, an uplink (UL) resource (e.g., PUCCH in LTE) for CSI reporting in a specific period is assigned to the UE.

For CSI estimation by the UE, transmission of downlink (DL) reference signal (RS) by the eNB is required.

In the case of a beamformed system to which (analog) beamforming is applied, it is necessary to determine a DL transmission (Tx)/reception (Rx) beam pair for the DL RS transmission/reception and a UL Tx/Rx beam pair for transmission/reception of UCI (uplink control information: e.g., CSI, ACK/NACK).

A process of determining the DL beam pair may be comprised of: a step (1) at which the eNB transmits a DL RS corresponding to a plurality of TRP Tx beams to the UE; a TRP Tx beam selecting step (2) at which the UE selects and/or report one of the plurality of plurality of TRP Tx beams; a step (3) at which the eNB repeatedly transmit the same RS signal corresponding to each TRP Tx beam; and a step (4) at which the UE selects a UE Rx beam by measuring different UE Rx beams with respect to the repeatedly transmitted signals.

In addition, a process of determining the UL beam pair is comprised of: a step (1) at which the UE transmits a UL RS corresponding to a plurality of UE Tx beams to the UE; a UE Tx beam selecting step (2) at which the eNB selects and/or signals one of the plurality of UE Tx beams; a step (3) at which the UE repeatedly transmit the same RS signal corresponding to each UE Tx beam to the eNB; and a step (4) at which the eNB selects a TRP Rx beam by measuring different TRP Rx beams with respect to the repeatedly transmitted signals.

In a case where DL/UL beam reciprocity (or beam correspondence) is satisfied, that is, in a case where it can be assumed that an eNB DL Tx beam and an eNB UL Rx beam coincides with each other and a UE UL Tx beam and a UE DL Rx beam coincides with each other in communication between the eNB and the UE, if one of the DL beam pair and the UL beam pair is determined, a process of determining the other one may be omitted.

A process of determining a DL and/or UL beam pair may be performed periodically or aperiodically.

In a case where there is a large number of candidate beams, a required RS overhead may be great, and thus, it is not desirable that the process of determining a DL and/or UL beam pair is performed often.

Suppose that the UE periodically performs SP (Semi-Persistent) CSI reporting after completion of the process of a DL/UL beam pair.

Here, a CSI-RS including a single antenna port or a plurality of antenna ports for CSI measurement by the UE may be beamformed into a TRP Tx beam, which is determined to be a DL beam, and then transmitted, and a transmission period of the CSI-RS may be equal to CSI reporting period or may be transmitted more frequently.

Alternatively, the UE may transmit an aperiodic CSI-RS more frequently in accordance with a CSI reporting period.

A terminal (e.g., a UE) may periodically transmit measured CSI information as a predetermined UL Tx during the process of determining a UL beam pair.

When the DL/UL beam management is performed, beam mismatch may occur according to a period of set beam management.

In particular, in a case where the UE moves in a location, where the UE rotates, or where a radio channel environment is changed due to movement of an object around the UE (e.g., the radio channel environment is changed from a Line-of-Sight (LoS) environment to a Non-LoS environment because a beam is blocked), an optimal DI/UL beam pair may be changed.

This change can be said as a beam failure event that occurs when tracking fails by a beam management process performed by a network instruction.

Whether the beam failure event occurs or not may be determined by the UE through reception quality of a DL RS, and a report message about this situation or a message for requesting beam recovery (hereinafter, referred to as a "beam recovery request message") should be transmitted from the UE.

The beam recovery request message may be expressed in various ways, for example, a beam failure recovery request message, a control signal, a control message, a first message, etc.

Having received the beam recovery request message from the UE, the eNB perform beam recovery through various processes, such as transmission of a beam RS to the UE to the UE and request for beam reporting.

A series of beam recovery processes described above is referred to as "beam recovery"

In 3GPP, standardization of a new communication system called a new radio or New Rat (NR) is undergoing, and the following descriptions are included in regard with beam management.

(Description 1)

NR supports a capability of the UE to trigger a mechanism for recovery from a beam failure.

A Network explicitly configures resources for UL transmission of signals for the purpose of recovery.

Configuration of resources which the eNB is listening in all or some directions is supported (e.g., a random access region).

(To be discussed later) Condition for triggering a recovery signal RS/control channel/data channel monitoring in regard with UE operation.

A DL signal allowing the UE to monitor a beam in order to identify new potential beams is supported.

(To be discussed later) Transmission of a beam sweep control channel is not excluded.

This mechanism should consider tradeoff between performance and DL signaling overhead.

(Description 2)

In consideration of the following possible candidate solutions, a beam management overhead a latency should be considered in a process of designing a CSI-RS for NR beam management.

Opt1. IFDMA

Opt2. Large subcarrier spacing

Other aspects considered in a process of designing of a CSI-RS for NR beam management includes, for example, CSI-RS multiplexing, UE beam switch latency, UE embodiment complexity (e.g., AGC training time), CRS-RS coverage, etc.

(Description 3)

A CSI-RS supports DL Tx beam sweeping and UE Rx beam sweeping.

An NR CSI-RS supports the following mapping structure.

An NP CSI-RS port may be mapped for each (sub) time unit.

The same CSI-RS antenna ports may be mapped throughout a (sub) time unit.

Here, the "time unit" indicates a symbol $n \geq 1$ OFDM in a configured/reference numerology.

Each time unit may be partitioned into sub-time units.

Such a mapping structure may be used to support multiple panels/Tx chains.

(Option 1)

Tx beam(s) are the same across the time units.

Tx beam(s) are different across time units.

(Option 2)

Tx beam(s) are different within each time unit.

Tx beam(s) are the same across the time units.

(Option 3): Combination of Option 1 and Option 2

The Tx beam(s) are the same across the sub-time units within one time unit.

The Tx beam(s) are different for each sub-time unit within another time unit.

Hereinafter, a beam failure recovery mechanism of the UE in regard with methods proposed in the present specification will be briefly described.

The beam failure recovery mechanism of the UE includes the following processes (1) to (4).

(1) Detect a beam failure (2) Identify a new candidate beam (3) Transmit a beam failure recovery request (4) The UE monitors a response of a gNB to the beam failure recovery request.

First, in the process of detecting a beam failure, the UE monitors a beam failure detection RS to check whether a beam failure trigger condition is satisfied.

The beam failure detection RS includes at least a periodic CSI-RS for beam management. Here, a synchronization signal (SS) block may be also used for beam management, and, when the SS block is used for beam management, the SS block in a serving call may be considered.

Here, the SS block may be interpreted such that an SS is transmitted in a slot unit or a specific time unit.

Here, the beam failure detection RS may include not just the case of measuring quality of the corresponding RS, but also the case of measuring detection/demodulation quality of an associated radio channel using the corresponding RS and Quasi Co-Location (QCL) indicator. For example, a CSI-RS or SS block-related ID, which is indicated for (primary) PDCCH monitoring, may be understood as the beam failure detection RS, and, in this case, whether a beam failure event occurs may be defined as a case where detection/demodulation performance of the corresponding PDCCH is equal to or lower than a preset level.

The occurrence of the beam failure event may happen when quality of beam pair link(s) of an associated control channel falls to a preset level or lower.

Specifically, the quality of beam pair link(s) of the associated control channel may be determined by PDCCH detection performance.

For example, in the process in which the UE monitors the PDCCH (or blind decoding), when PDCCH detection performance is poor according to a result of CRC check, the UE may detect a beam failure.

Alternatively, in a case where multiple PDCCHs is transmitted through multiple beams (or multiple PDCCHs are transmitted through different beams), whether the beam failure event occurs may be determined by detection performance of a specific PDCCH (e.g., a serving beam and an associated PDCCH).

Here, each of the multiple PDCCHs may be transmitted and/or received for different beams through different control channels (e.g., symbols, slots, subframes, etc.).

In this case, a control channel area for each beam may be predefined or may be transmitted and received through higher layer signaling.

In addition, in a case where whether the beam failure event occurs determined by quality of beam pair link(s) of the associated control channel, where whether the beam failure event occurs may be determined depending on whether quality of DL beam is reduced to a preset level or lower, whether quality of only UL beam is reduced to a preset level or lower, or whether quality of both DL beam and UL beam is reduced to a preset level or lower.

Here, being lower than the preset level may be being lower than a preset value, time-out of an associated timer, etc.

In addition, as a signal for detecting the beam failure, a BRS, an RS for fine timing/frequency tracking, SS blocks, a DM-RS for a PDCCH, a DM-RS for a PDSCH, and the like may be used.

Next, in the process of identifying a new candidate beam, the UE discovers a new candidate beam by monitoring a beam identification RS.

Beam identification RS may include a periodic CSI-RS for beam management 1) when the beam identification RS is configured by NW, and may include information on a periodic CSI-RS and an SS block in a serving cell when the SS block is used for beam management.

Next, in the process of transmitting a beam failure recovery request, information transported upon a beam failure recovery request includes at least one on 1) explicit/implicit information for identifying UE and new gNB TX beam information or 2) explicit/implicit information as to whether there is a new candidate beam after identification of the UE.

In addition, transmission of the beam failure recovery request may select one of PRACH, PUCCH, and PRACH-like (e.g., a different parameter for a preamble sequence from the PRACH).

The beam failure recovery request resource/signal may be additionally used upon a scheduling request.

Next, the Ue monitors a channel search space to receive a response of a gNB to the beam failure recovery request.

In addition, the following condition is supported regarding transmission of a beam failure recovery request.

Condition: case where a beam failure is detected and a failure beam is identified when only a CSI-RS is used to identify a new candidate beam In addition, the following channel is supported to transmit the beam failure recovery request.

At resource orthogonal to a resource for transmission of at least a different PRACH is used with respect to PRACH-based non-competition-based channel, FDM.

A PUCCH for transmission of the beam failure recovery request is supported.

As described above, in the case of NR, the beam recovery request message may support (1) a (first) mechanism in which the beam recovery request message is transmitted using the same symbols as the PRACH, and (2) a (second) mechanism in which the beam recovery request message is transmitted using symbols other than the PRACH.

The first mechanism may be a useful mechanism when uplink synchronization is lost due to a beam failure (when beam quality is relatively significantly reduced or when there is no replacement beam) and/or when a beam failure event occurrence timing and a preset PRACH resource are temporally close to each other.

The second mechanism may be a useful mechanism when a beam failure or uplink synchronization is not lost (when beam quality is reduced relatively a little bit or when there is any replacement beam) and/or when a beam failure event occurrence timing and a preset PRACH resource are temporally far from each other, whereby quick beam recovery is too difficult to wait for a PRACH resource (e.g., symbol).

In addition, upon a beam failure, the UE may transmit the beam failure request message to the eNB a predetermined number of times, and, when a response to the request is not received from the eNB, the UE may perform Radio Link Failure (RLF).

Hereinafter, a method proposed in the present specification for recovering a beam when a beam failure occurs due to movement of the UE will be described.

In particular, in the present specification, a method for recovering a beam may be performed depending on whether there is a replacement beam, and a detailed description thereof will be provided later on.

A beam RS (reference Signal) (BRS) used in the present specification is a DL physical signal used for beam management, and a CSI-RS, a Mobility RS (MRS), a synchronization signal, and the like may be used as a Beam RS.

The beam RS may be set by a resource setting (as an RRC layer) on a beam management framework (or a CSI framework). That is, the Beam RS may be preset by the resource setting.

As described in the following, the beam management framework is a structure showing an associated relationship beam reporting setting(s), beam resource setting(s), beam resource set, measurement setting(s). A further detailed description thereof will be provided later on.

In addition, Beam reporting used in the present specification indicates beam-related feedback information of the UE, and may include beam quality-related information and/or beam indication information.

"A and/or B", "A and/or B", and "A/B" in the present specification may be interpreted as the same as the expression "including at least one of A or B".

The beam quality related information may be Channel Quality Information (CQI), Layer 3 Reference Signals Received Power (RSRP), Layer 1 RSRP, and the like.

In addition, the beam indication information may be CSI-RS resource indicator (CRI), Precoding Matrix Indicator (PMI), RS port index, and the like.

The beam-related feedback information, a parameter, a reporting period, a frequency unit (granularity (e.g., wideband feedback, subband feedback), and the like may be set by a reporting setting (as an RRC layer message) on the beam management framework (or CSI framework).

That is, the beam-related feedback information, a reporting frequency unit, and the like may be preset by the reporting setting.

In a case where the UE transmits a beam recovery request to a network (e.g., the eNB), the network may perform the two operations (Method 1 and Method 2) as below.

(Method 1)

Method 1 indicates a network operation in a case where there is no replacement beam (e.g., replacement DL beam pair).

That is, Method 1 relates to a method for transmitting an (aperiodic) beam RS (or triggering a Beam RS) and transmitting an (aperiodic) Beam reporting trigger to the UE when the network receives a beam recovery request from the UE.

The replacement beam may be understood as an RS set that is set by the eNB for periodic beam management or monitoring, and may be provided in number equal to or less than the number of sets of beams that the UE can measure.

That is, the replacement beam may be RS(s) having a specific quality among RSs that is set for beam management.

For example, the network may set N number of CSI-RS resources for periodic beam management or monitoring to the UE.

However, the UE may measure signal quality not just from the N number of CSI-RS resources but also from M number of beamformed SS blocks (having a wider coverage). Thus, a certain UE may not able to find a replacement beam from the N number of CSIRS and may be able to find a replacement beam, that is, a signal having a specific quality or higher, from the M number of SS block. However, in this case, since the SS block is cell-specific and periodic, the SS block is not suitable for being included in the range of the above-described (aperiodic) Beam RS that has to be transmitted on demand UE-specifically. Accordingly, in this case may be regarded as falling into the range of Method 1 in which a subsequent process for transmitting an (aperiodic) beam RS (e.g., CSI-RS) to the UE although there is a replacement SS block beam.

FIG. 10 shows an example of a network operation according to whether there is a replacement beam proposed by the present specification.

Specifically, FIG. 10A is a diagram showing Method 1 proposed in the present specification.

Here, the Beam RS trigger and the Beam reporting trigger may be signaled or may be jointly signaled.

For example, the network may trigger a Beam RS and Beam reporting jointly using one DCI.

Referring to FIG. 10A, the network transmit a (periodic) Beam RS to DL.

Next, when the network receives a beam recovery request from the UE, the network triggers an (aperiodic) Beam RS and (aperiodic) beam reporting jointly to the UE (according to Method 1).

Accordingly, the UE performs beam measurement through a reference resource and reports a result of the beam measurement to the network.

A specific method for determining the reference resource will be described later on.

(Method 2)

Method 2 shows a network operation when there is a replacement DL beam pair.

That is, in Method 2, when the network receives a beam recovery request from the UE, the network perform (aperiodic) Beam reporting trigger, as shown in FIG. 10B.

FIG. 10B is a diagram showing Method 2 proposed in the present specification.

Referring to FIG. 10B, the network transmit a (periodic) Beam RS to DL.

Then, when the network receives a beam recovery request from the UE, the network triggers (aperiodic) beam reporting to the UE.

Here, in Method 2 unlike Method 1, since the UE is aware of a replacement beam pair, the network does not transmit (or does not trigger) the (aperiodic) beam RS additionally to the corresponding UE.

Accordingly, the UE performs beam measurement through a reference resource, and report a result of the beam measurement to the network.

Here, a preferred Tx beam indicator and a beam quality metric may be transmitted jointly in the beam reporting process.

As described above, in Method 2, when the UE is aware of information on a DL Tx beam (or DL beam pair) to replace from a channel measured through a preset RS, beam RS transmission by the network and beam RS reception by the UE may be omitted and thus Method 2 is a useful method.

On the contrary, the above-described Method 1 is a method that is useful when there is no replacement beam or when the eNB cannot be aware of whether there is a replacement beam.

In addition, (beam) reporting setting may not be differentiated with respect to Method 1 and Method 2.

That is, in Method 1 and Method 2, beam reporting may configure the same feedback information, have the same time domain behavior (e.g., aperiodic reporting), and have the same frequency granularity.

The same feedback information may include, for example, preferred DL Tx beam indicator(s) and beam quality metric(s).

The preferred DL Tx beam indicator may be, for example, beam ID, CSI Resource Indicator (CRI), RS port index, and the like.

The beam quality metric may be, for example, L1 RSRP, CQI, and the like.

In a beam recovery method proposed in the present specification, the network may support at least one setting method to the UE through RRC signaling.

Figure 11:
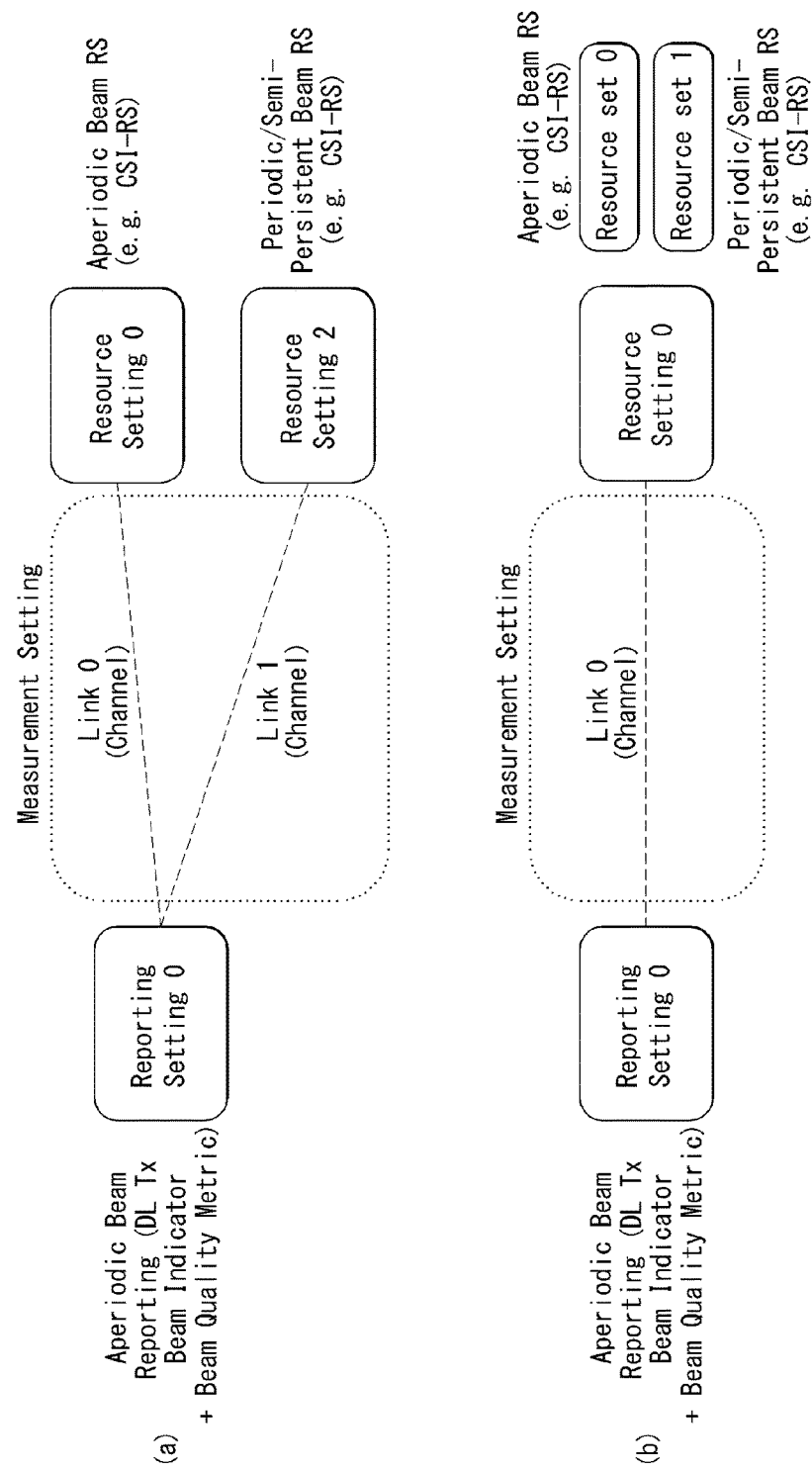
FIG. 11 is a diagram showing an example of a beam-related setting method which can be applied to methods proposed in the present specification.

FIG. 11 is a diagram showing an example of a beam-related configuring method to which methods proposed in the present specification can be applied.

(Setting Method 1)

Referring to FIG. 11A, reporting setting may include one aperiodic CSI/beam reporting setting, and resource setting may include one aperiodic beam RS setting (e.g., CSI-RS) and one periodic/semi-persistent beam RS setting.

Here, a plurality of reporting setting may be expressed as reporting settings, and a plurality of resource setting may be expressed as resource settings.

In addition, resource setting may include one or more resource sets.

Referring to FIG. 11A, it can be observed that one reporting setting and two resource settings are respectively connected via a link (or channel) in a measurement setting.

(Setting Method 2)

Referring to FIG. 11B, reporting setting includes one aperiodic CSI/beam reporting setting, resource setting includes one beam RS setting, and the beam RS setting includes at least two resource sets, as below.

Resource set with aperiodic RS(s) (e.g., CSI-RS)
Resource set with periodic/semi-persistent beam RS(s) (e.g. CSI-RS)

In addition, the two settings (reporting setting and resource setting) are connected to one link (or channel) within a measurement setting.

As described above, Setting Method 1 is useful when (aperiodic, semi-persistent (SP), periodic) time-domain behavior is commonly set on the basis of a resource setting unit.

In addition, Setting Method 2 may be useful when the time-domain behavior is commonly set on the basis of a resource set unit within a resource setting.

Then, a method for providing the network (or the eNB) with information on which one of Method 1 and Method 2 is preferred by the UE or information on whether there is a replacement beam (or whether there is a measurement) from a pre-measured RS will be described in detail.

The information on which method for transmission to the network is preferred by the UE or the information on whether there is a replacement beam will be hereinafter referred to as "control information".

Here, the control information may be included in a beam recovery signal or a beam failure reporting signal.

The control information may be an indicator or indication information directly indicating whether there is a replacement beam, preferred link information associated with a pre-configured aperiodic beam reporting setting (in case of Setting Method 1), preferred resource setting information (in case of Setting Method 1), or preferred resource set information (in case of Setting Method 2).

The control information may be transmitted to the network as physical layer control information such as Uplink Control Information (UCI) in the LTE system and may be transmitted in the form of a higher layer message (e.g., MAC CE).

In particular, the UE may transmit the control information using the same resource (e.g., symbol(s)) of PRACH.

When the UE uses (or transmits) a signal code-division-multiplexed (CDM) or frequency-division-multiplexed (FDM) with the PRACH as a beam recovery signal, a sequence set to be used in the PRACH may be divided and used depending on whether there is a replacement beam.

For example, when the sequence set to be used in the PRACH is divided and used, separated root index(es) or cyclic shift values may be used.

Alternatively, when the UE uses a signal code-division-multiplexed (CDM) or frequency-division-multiplexed (FDM) with the PRACH as a beam recovery request signal, a sequence set identical to a sequence set used in the PRACH may be used. However, in this case, whether the signal is the PRACH or the beam recovery request may be identified by applying different time domain/frequency domain Orthogonal Cover Code (OCC).

In addition, the network (or the eNB) may include at least one of the following information (1) to (4) when instructing aperiodic reporting triggering to the UE as an MAC control element (CE), which is a higher layer message, and Downlink Control Information (CD), which is a physical layer message.

(1) Information on a Valid/Invalid Link within the Pre-Associated Settings (in the Case of Method 1)

The UE performs beam measurement and beam reporting on the beam measurement by determining only an RS included in a resource setting, which is indicated as a valid link (or not indicated as an invalid link) among a plurality of resource settings pre-associated as a measurement setting, as a reference source.

(2) Information on Valid/Invalid Resource Setting within the Pre-Associated Settings (in the Case of Setting Method 2).

The UE performs beam measurement and beam reporting
by determining only an RS included in a valid resource setting (or not indicated as an invalid resource setting) among a plurality of resource settings pre-associated as a measurement setting as a reference source.

(3) Information on Valid/Invalid Resource Sets within the Pre-Associated Resource Settings (in the Case of Setting Method 2).

The UE performs beam measurement and beam reporting
by determining only an RS included in a valid resource set among resource sets pre-associated as a measurement setting as a reference source.

(4) Reporting Type/Mode Setting Method (Applying to Both Setting Method 1 and Setting Method 2)

Reporting type/mode setting information indicates an indicator or indication information as to whether triggering of an aperiodic resource is indicated jointly with triggering of aperiodic reporting or whether only aperiodic reporting is triggered.

Here, when triggering of an aperiodic resource and triggering of aperiodic reporting are indicated jointly, the reporting type or mode may be expressed as a joint triggering mode or a first mode, and, when only triggering of aperiodic reporting is indicated, the reporting type or mode may be expressed as a reporting triggering only mode or a second mode.

In the joint triggering mode (or the first mode), the UE performs beam measurement and beam reporting by determining only an aperiodic resource setting/resource set among resource settings configured by RRC (Setting Method 1) or a resource set (Setting Method 2) as a reference resource.

That is, the UE ignores a periodic resource/semi-persistent resource connected to aperiodic reporting.

In addition, in the reporting triggering only mode (or the second mode), the UE performs beam measurement and beam reporting by determining only a periodic or semi-persistent resource setting/resource set from an RRC-configured resource setting (Setting Method 1) and a resource set (Setting Method 2) as a reference source.

That is, the UE ignores an aperiodic resource connected to aperiodic reporting.

Further, when the UE reports to the eNB about information as to which one of Method 1 and Method 2 is preferred or information as to whether there is a replacement beam from a pre-measured RS (or whether there is a measurement), the eNB may transmit, to the UE, information (confirmation message or ACK/NACK) indicating whether to apply the report information of the UE.

When the report information of the UE is transmitted to the eNB before the above-described aperiodic reporting triggering of the eNB is instructed, information as to whether to apply the report information of the UE may be transmitted together with the above information (1) to (4) when the aperiodic reporting triggering is instructed.

When the UE reports the eNB about information as to which one of Method 1 and Method 2 is preferred or information as to whether there is a replacement beam from a pre-measured RS (or whether there is a measurement), the eNB may transmit, to the UE, information for confirming reception and application of the corresponding information.

For example, when the eNB transmits a confirmed (or ACK) message to the UE, it means that the eNB confirms to apply the information transmitted by the UE.

Alternatively, when the eNB does not transmit a confirmed message or transmits a not-confirmed (or NACK) message to the UE, the eNB may request that the UE additionally transmit some of the above-described information (1) to (4) or may request that the UE re-transmit information on which one of Method 1 and Method 2 is preferred or information on whether there is a replacement beam (or whether there is a measurement).

As described above, the information on which one of Method 1 and Method 2 is preferred or the information on whether there is a replacement beam (or whether there is a measurement) may be referred to as "control information".

In addition, when the information on which one of Method 1 and Method 2 is preferred or the information on whether there is a replacement beam (or whether there is a measurement) is reported (beforehand) to the eNB, the above-described information (1) to (4) may be omitted.

Next, a method for determining *(or deciding) a reference resource for beam measurement and beam reporting will be described.

The UE explicitly or implicitly report to the eNB about information indicating (i) that there is a measurement of a replacement beam (or information indicating that Method 2 is preferred) through a beam recovery request signal (or a beam failure reporting signal).

Next, when the UE is instructed by the eNB to perform aperiodic beam reporting triggering (within a specific time or before expiration of a specific timer), the UE may determine a resource activated (or triggered or configured) before a slot receiving a reporting triggering message from among resource settings associated with the corresponding aperiodic beam reporting (Setting Method 1) and a resource (RS) included in a resource set (Setting Method 2) as a reference resource and then may perform beam measurement and beam reporting.

That is, the reference resource is determined as a specific resource that is activated before the reporting triggering message is received.

For a description thereof, FIG.—regarding Method 2 is referred to.

As another example, the UE explicitly or implicitly reports to the eNB about information indicating (ii) that there is no measurement on a replacement beam (or information indicating that Method 1 is preferred) through a beam recovery request signal (or a beam failure reporting signal).

Next, when the UE is instructed by the eNB to perform aperiodic beam reporting triggering (within a specific time or before expiration of a specific timer), the UE may determine a resource (e.g., triggered/activated aperiodic RS in later slot(s)) to be activated (or triggered or configured) at a timing of a slot identical to a slot receiving a reporting triggering message or at a later timing from among resource settings associated with the corresponding aperiodic beam reporting (Setting Method 1) and a resource (RS) included in a resource set (Setting Method 2) as a reference resource and then may perform beam measurement and beam reporting.

That is, the reference resource may be determined as a specific resource that is to be activated in a slot identical to a slot receiving the reporting triggering message or in a slot after receiving the reporting triggering message.

Figure 12:
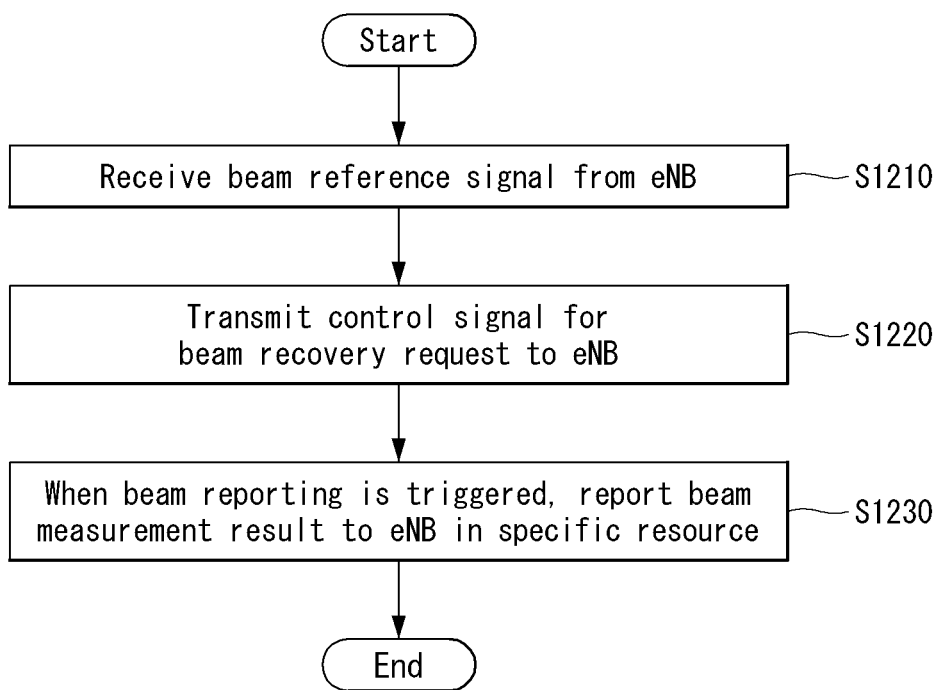
FIG. 12 is a flowchart showing a method for performing beam recovery proposed in the present specification.

FIG. 12 is a flowchart illustrating a method for performing beam recovery proposed in the present specification.

First, the UE receives a beam reference signal (BRS) used for beam management from the eNB (S1210).

Next, when the UE detects a beam failure event, the UE transmits a control signal for a beam failure recovery request to the eNB (S1220).

The beam failure event may be detected based on the received BRS.

The control signal includes indicating information indicating that there is a replacement beam.

As described above, the replacement beam may refer to a reference signal having a channel quality greater than a specific channel quality from among reference signals configured for the beam management.

Next, when beam reporting is triggered, the UE reports to the eNB about a beam measurement result in a specific resource (S1230).

The control signal may use the same time resource of a Physical Random Access Channel (PRACH).

In this case, the control signal may be code-division-multiplexed (CDM) or frequency-division-multiplexed (FDM) with the PRACH in the time resource.

The control signal may be transmitted through a Physical Uplink Control Channel (PUCCH).

The control signal may use different time and/or frequency resources, different sequence sets, and/or different Uplink Control Information (UCI) according to whether there is the replacement beam.

In this case, the different sequence sets may be discriminated by a root sequence index or a cyclic shift value.

In addition, the indication information may be information on a preferred link associated with a preset aperiodic beam reporting setting, information on a preferred resource setting associated with a preset aperiodic beam reporting setting, or information on a preferred resource set associated with a preset aperiodic beam reporting setting.

Further, the UE may receive indication information indicating triggering of the beam reporting from the eNB.

Here, the beam reporting may be triggered based on the indication message.

The indication message may include at least one of the following: information on a valid or invalid link among settings pre-associated as measurement settings, information on a valid or invalid resource setting among settings pre-associated as measurement settings, information on a valid or invalid resource set among settings pre-associated as measurement settings, and beam reporting mode setting information.

The measurement setting may be that one reporting setting and two resource settings are connected via a link or that one reporting setting and one resource setting are connected via a link.

The beam reporting mode setting information may indicate a first mode where aperiodic beam reference signal transmission and aperiodic beam reporting are triggered jointly, or a second mode where only aperiodic beam reporting is triggered.

The first mode indicates the above-described joint triggering mode, and the second mode indicates the above-described reporting triggering only mode.

If the beam reporting mode setting information is set to the first mode, the specific resource may be aperiodic resource setting or a aperiodic resource set from among resource settings or resource sets configured by Radio Resource Control (RRC).

In this case, the specific resource may be a resource that is activated to enable beam measurement in a slot identical to a slot receiving the indication message or in a slot after reception of the indication message.

Alternatively, when the beam reporting mode setting information is set to the second mode, the specific resource may be a periodic or semi-persistent resource setting or resource set from among resource settings or resource sets configured by RRC.

In this case, the specific resource may be a resource that is activated to enable beam measurement before a slot receiving the indication message.

Further, the UE may receive a response to the reporting from the eNB.

If the response is NACK, the UE may re-transmit, to the eNB, information including at least one of the indication information or information included in the indication message.

General Description about Device to which the Present Disclosure can be Applied

Figure 13:
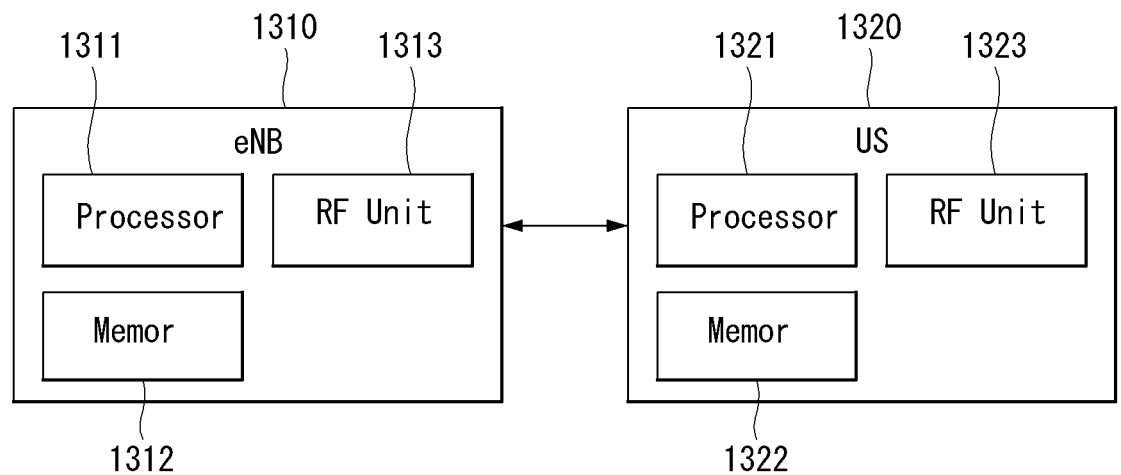
FIG. 13 shows an example of a block diagram of a wireless communication device according to an embodiment of the present disclosure.

FIG. 13 shows an example of a block diagram of a wireless communication device according to an embodiment of the present disclosure.

Referring to FIG. 13, the wireless communication system includes an eNB (or network) 1310 and a UE 1320.

The eNB 1310 includes a processor 1311, a memory 1312, a communication module 1313.

The processor 1311 implements the functions, processes and/or methods proposed in FIGS. 1 to 12. The layers of a wired/wireless interface protocol may be implemented by the processor 1311. The memory 1312 is connected to the processor 1311, and stores various types of information for driving the processor 1311. The communication module 1313 is connected to the processor 1311, and transmits and/or receives wired/wireless signals.

The communication module 1313 may be a radio frequency (RF) unit to transmit and receive radio signals.

The UE 1320 includes a processor 1321, a memory 1322, and a communication module (or an RF unit) 1323. The processor 1321 implements the functions, procedures and/or methods proposed in the present disclosure in FIGS. 1 to 12. The layers of a wireless interface protocol may be implemented by the processor 1321. The memory 1322 is connected to the processor 1321 and stores information related to operations of the processor 1321. The communication module 1323 is connected to the processor 1321 and transmits and/or receives radio signals.

The memories 1312 and 1322 may be positioned inside or outside the processors 1311 and 1321, ad may be connected to the processors 1311 and 1321 through various well-known means.

In addition, the eNB 1310 and/or the UE 1320 may have single antenna or multiple antennas.

Figure 14:
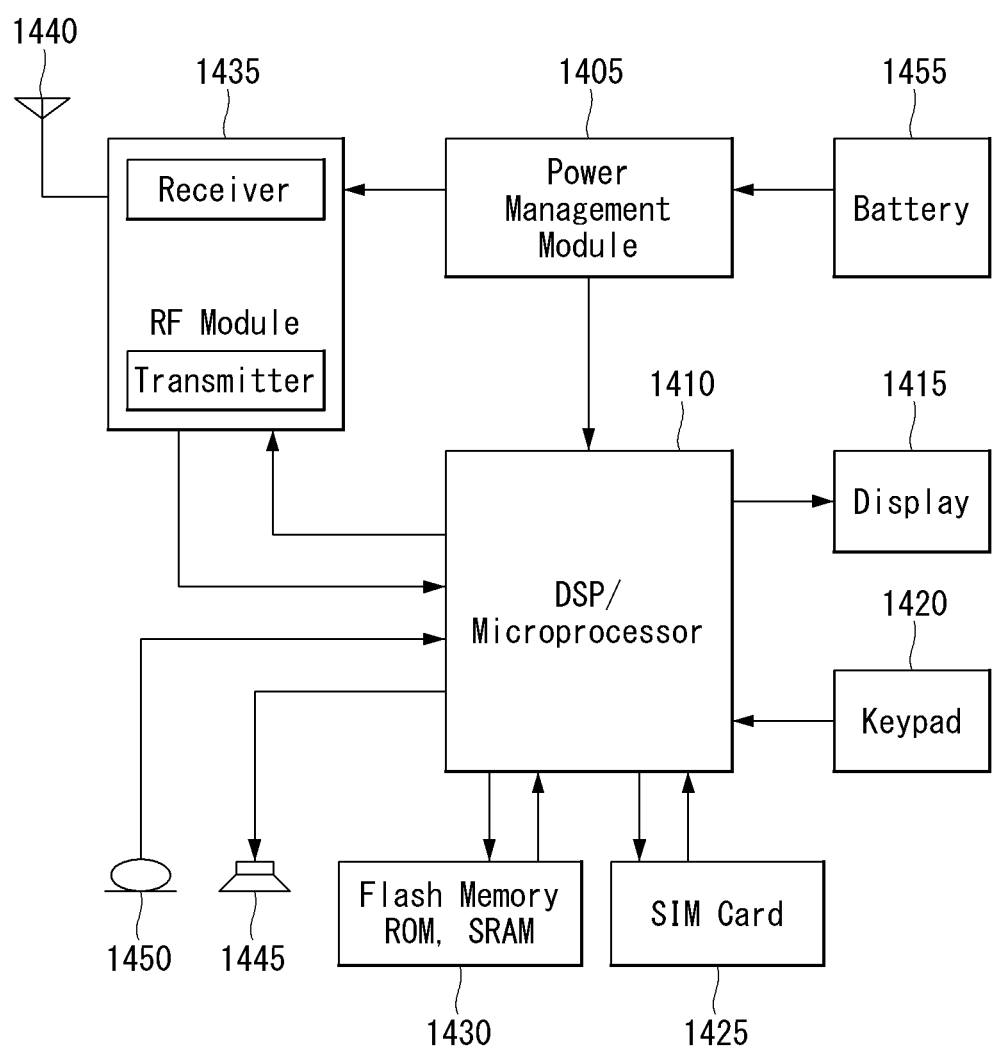
FIG. 14 shows an example of a block diagram of a communication device according to an embodiment of the present disclosure.

FIG. 14 shows an example of a block diagram of a communication device according to an embodiment of the present disclosure.

In particular, FIG. 14 is a diagram showing the UE of FIG. 13 in more detail.

Referring to FIG. 14, the UE includes a processor (or digital signal processor) 1410, an RF module (RF unit) 1435, a power management module 1405, an antenna 1440, a battery 1455, a display 1415, a keypad 1420, memory 1430, a subscriber identification module (SIM) card 1425 (this may be optional), a speaker 1445 and a microphone 1450. The UE may include a single antenna or multiple antennas.

The processor 1410 may be configured to implement the functions, procedures and/or methods proposed in the present disclosure in FIGS. 1 to 12. The layers of a wireless interface protocol may be implemented by the processor 1410.

The memory 1430 is connected to the processor 1410 and stores information related to operations of the processor 1410. The memory 1430 may be positioned inside or outside the processor 1410 and may be connected to the processors 1410 through various well-known means.

A user enters instruction information, such as a telephone number, by pushing the buttons of a keypad 1420 or by voice activation using the microphone 1450, for example. The processor 1410 receives and processes the instruction information to perform an appropriate function, such as to dial a telephone number. Operational data may be retrieved from the SIM card 1425 or the memory module 1430 to perform the function. Furthermore, the processor 1410 may display the instructional and operational information on the display 1415 for the user's reference and convenience.

The RF module 1435 is connected to the processor 1410, transmits and/or receives an RF signal. The processor 1410 issues instructional information to the RF module 1435, to initiate communication, for example, transmits radio signals comprising voice communication data. The RF module 1435 includes a receiver and a transmitter to receive and transmit radio signals. An antenna 1440 facilitates the transmission and reception of radio signals. Upon receiving radio signals, the RF module 1435 may forward and convert the signals to baseband frequency for processing by the processor 1410. The processed signals would be transformed into audible or readable information outputted via the speaker 1445.

The above-described embodiments of the present disclosure are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some elements or features of any one embodiment may be included in another embodiment and may be replaced with corresponding elements or features of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, an embodiment of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. performing a function or an operation described above. Software code may be stored in a memory unit and executed by a processor. The memory unit may be located inside of the processor or outside thereof to transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

A beam management method in a wireless communication of the present disclosure has been described mainly about an example applied to a 3GPP LTE/LTE-A system and 5G, but may be applied to other wireless communication systems.

The invention claimed is:

1. A method performed by a user equipment (UE) for beam failure recovery in a wireless communication system, the method comprising:
receiving, from a base station, information for a beam reference signal (BRS) set including at least one BRS used for beam management;
based on a beam failure event being detected, transmitting a control signal for a beam failure recovery request to the base station; and
based on beam reporting being triggered, reporting a beam measurement result in a specific resource to the base station,
wherein the control signal comprises indication information directly indicating whether there is a replacement beam in the BRS set, and wherein based on the indication information indicating that there is a replacement beam, information indicating the replacement beam is transmitted from the UE to the base station,
wherein the replacement beam is related to a reference signal having a quality greater than a specific quality threshold in the BRS set, and wherein aperiodic reference signal transmission and aperiodic beam reporting are triggered together.

2. The method of claim 1, further comprising receiving, from the base station, an indication message indicating triggering of the beam reporting,
wherein the beam reporting is triggered based on the indication message.

3. The method of claim 2, wherein the indication message comprises information regarding a valid or invalid resource set among settings pre-associated as measurement settings.

4. The method of claim 3, wherein, in the measurement setting, one reporting setting and one or more resource settings are associated.

5. The method of claim 1, wherein the specific resource is an aperiodic resource setting or aperiodic resource setting among resource settings or resource sets configured by radio resource control (RRC).

6. The method of claim 1, wherein the BRS set includes at least one periodic BRS.

7. The method of claim 1, wherein the BRS set includes at least one of (i) at least one channel state information-reference signal (CSI-RS) or (ii) at least one synchronization signal block (SSB).

8. The method of claim 1, wherein the indication information is included in a medium access control (MAC) control element (CE).

9. The method of claim 1, wherein the quality is a layer 1-reference signal received power (L1-RSRP).

10. The method of claim 1, wherein the beam measurement result includes beam indication information and beam quality information.

11. A user equipment (UE) for performing beam failure recovery in a wireless communication system, the UE comprising:
a radio frequency (RF) module configured to transmit and receive radio signals;
a processor functionally connected to the RF module,
wherein the processor is configured to:
receive, from a base station, information for a beam reference signal (BRS) set including at least one BRS used for beam management;
based on a beam failure event being detected, transmit a control signal for a beam failure recovery request to the base station; and
based on beam reporting being triggered, report a beam measurement result in a specific resource to the base station,
wherein the control signal comprises indication information directly indicating whether there is a replacement beam in the BRS set, and wherein based on the indication information indicating that there is a replacement beam, information indicating the replacement beam is transmitted from the UE to the base station,
wherein the replacement beam is related to a reference signal having a quality greater than a specific quality threshold in the BRS set, and
wherein aperiodic reference signal transmission and aperiodic beam reporting are triggered together.

* * * * *